(12) United States Patent
Wissmann et al.

(10) Patent No.: US 11,815,446 B2
(45) Date of Patent: Nov. 14, 2023

(54) METHODS AND APPARATUS FOR CHARACTERIZING A SPECIMEN CONTAINER AND SPECIMEN

(71) Applicant: Siemens Healthcare Diagnostics Inc., Tarrytown, NY (US)

(72) Inventors: Patrick Wissmann, Munich (DE); Benjamin S. Pollack, Jersey City, NJ (US); Ludwig Listl, Munich (DE)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 421 days.

(21) Appl. No.: 16/072,427

(22) PCT Filed: Jan. 24, 2017

(86) PCT No.: PCT/US2017/014777
§ 371 (c)(1),
(2) Date: Jul. 24, 2018

(87) PCT Pub. No.: WO2017/132171
PCT Pub. Date: Aug. 3, 2017

(65) Prior Publication Data
US 2018/0372648 A1  Dec. 27, 2018

Related U.S. Application Data

(60) Provisional application No. 62/288,381, filed on Jan. 28, 2016.

(51) Int. Cl.
*G01N 21/13* (2006.01)
*G01N 21/25* (2006.01)
(Continued)

(52) U.S. Cl.
CPC .......... *G01N 21/13* (2013.01); *G01N 15/042* (2013.01); *G01N 21/253* (2013.01);
(Continued)

(58) Field of Classification Search
CPC ...... G01N 21/88; G01N 15/042; G01N 21/13; G01N 21/253; G01N 21/255;
(Continued)

(56) References Cited

U.S. PATENT DOCUMENTS 5,671,085 A * 9/1997 Gustafsson ............ G02B 21/22
                                                    359/383
5,876,107 A * 3/1999 Parker .................. G02B 6/0036
                                                    362/600
(Continued)

FOREIGN PATENT DOCUMENTS

CN    104297162 A    1/2015
CN    104841646 A    8/2015
(Continued)

OTHER PUBLICATIONS

Extended EP Search Report dated Dec. 6, 2018 of corresponding European Application No. 17744782.8, 10 Pages.
(Continued)

*Primary Examiner* — Hyun D Park
*Assistant Examiner* — Lyudmila Zaykova-Feldman

(57) ABSTRACT

A quality check module for characterizing a specimen and/or a specimen container. The quality check module includes an imaging location within the quality check module configured to receive a specimen container containing a specimen, one or more cameras located at one or more viewpoints adjacent to the imaging location, and one or more spectrally-switchable light source including a light panel assembly located adjacent the imaging location and configured to provide lighting for the one or more cameras, the spectrally-switchable light source configured to be operatively switchable between multiple different spectra. Methods of imaging a specimen and/or specimen container and specimen, and specimen testing apparatus including a quality check
(Continued)

module adapted to carry out the method are described herein, as are other aspects.

20 Claims, 12 Drawing Sheets

(51) Int. Cl.
*G01N 15/04* (2006.01)
*G01N 35/00* (2006.01)
*G01N 21/88* (2006.01)

(52) U.S. Cl.
CPC .......... *G01N 21/255* (2013.01); *G01N 21/88* (2013.01); *G01N 35/00663* (2013.01); *G01N 35/00613* (2013.01); *G01N 2015/045* (2013.01); *G01N 2021/8845* (2013.01); *G01N 2201/0627* (2013.01)

(58) Field of Classification Search
CPC ....... G01N 35/00663; G01N 2015/045; G01N 2021/8845; G01N 2201/0627; G01N 35/00613; G06K 9/6212
See application file for complete search history.

(56) References Cited

U.S. PATENT DOCUMENTS

| | | |
|---|---|---|
| 6,353,471 B1 | 3/2002 | Samsoondar et al. |
| 6,987,274 B1* | 1/2006 | Street ............... G02B 21/002 250/458.1 |
| 7,422,693 B2 | 9/2008 | Carter et al. |
| 7,663,738 B2 | 2/2010 | Johansson |
| 7,760,340 B2 | 7/2010 | Hoshiko et al. |
| 7,771,659 B2* | 8/2010 | Ziegler ................ G01N 35/10 422/65 |
| 7,854,891 B2 | 12/2010 | Yamamoto et al. |
| 7,982,201 B2 | 7/2011 | Bryant et al. |
| 8,064,061 B2 | 11/2011 | Yamamoto et al. |
| 8,194,235 B2 | 6/2012 | Kosaka et al. |
| 8,380,444 B2 | 2/2013 | Kim et al. |
| 8,381,581 B2 | 2/2013 | Walsh et al. |
| 8,545,760 B2 | 10/2013 | Yamamoto et al. |
| 8,859,289 B2* | 10/2014 | Marty ............... G01N 35/00594 422/65 |
| 9,322,761 B2 | 4/2016 | Miller |
| 10,746,665 B2 | 8/2020 | Kluckner et al. |
| 10,816,538 B2 | 10/2020 | Kluckner et al. |
| 2001/0004285 A1 | 6/2001 | Cadell et al. |
| 2004/0186351 A1 | 9/2004 | Imaizumi et al. |
| 2006/0033933 A1* | 2/2006 | Feierabend ......... G01N 21/6458 356/512 |
| 2007/0061111 A1* | 3/2007 | Jung ................ G01J 1/0411 702/188 |
| 2007/0146710 A1* | 6/2007 | Kowarz ............... G01N 21/255 356/416 |
| 2007/0216898 A1* | 9/2007 | Gardner, Jr. ............ G01J 3/02 356/244 |
| 2008/0055897 A1 | 3/2008 | Yoshida et al. |
| 2008/0144898 A1 | 6/2008 | Hunt |
| 2009/0040754 A1* | 2/2009 | Brukilacchio ........... F21K 9/61 362/228 |
| 2009/0042179 A1* | 2/2009 | Peltie ................. A61B 1/00186 382/120 |
| 2009/0080611 A1 | 3/2009 | Ganz et al. |
| 2010/0110220 A1 | 5/2010 | Leugers et al. |
| 2011/0050884 A1* | 3/2011 | Niedermeier ...... G01N 21/9036 382/142 |
| 2011/0164124 A1* | 7/2011 | Hizume .............. G01N 21/6456 348/61 |
| 2011/0267450 A1 | 11/2011 | Pronkine |
| 2011/0304820 A1* | 12/2011 | Fait ............................ G06T 5/50 351/206 |
| 2012/0140230 A1* | 6/2012 | Miller ................... G06T 7/0012 356/432 |
| 2013/0076882 A1* | 3/2013 | Itoh ........................ G01N 21/25 382/134 |
| 2014/0267672 A1* | 9/2014 | Morrison ............... H04N 5/332 348/79 |
| 2014/0293036 A1 | 10/2014 | Ddecaux et al. |
| 2014/0340539 A1* | 11/2014 | Venkataraman ....... G02B 5/208 348/218.1 |
| 2014/0362602 A1 | 12/2014 | Hofman |
| 2015/0109430 A1* | 4/2015 | Li ........................... G02B 21/34 359/385 |
| 2015/0323462 A1* | 11/2015 | Ghosh ............. G01N 35/00029 435/29 |
| 2015/0369664 A1* | 12/2015 | Garsha ................. G02B 21/365 356/402 |
| 2017/0167980 A1* | 6/2017 | Dimitriadis ............... G01J 3/10 |

FOREIGN PATENT DOCUMENTS

| | | |
|---|---|---|
| EP | 1186893 B1 | 1/2008 |
| EP | 1967840 A2 | 9/2008 |
| GB | 989 659 A | 4/1965 |
| JP | H04-069776 A | 3/1992 |
| JP | H09-021916 A | 1/1997 |
| JP | 2010-534837 A | 11/2010 |
| JP | 2011-089978 A | 5/2011 |
| JP | 2011-247635 A | 12/2011 |
| JP | 2013-501937 A | 1/2013 |
| WO | 0036400 A1 | 6/2000 |

OTHER PUBLICATIONS

PCT International Search Report and Written Opinion dated Apr. 18, 2017 (10 Pages).

* cited by examiner

METHODS AND APPARATUS FOR CHARACTERIZING A SPECIMEN CONTAINER AND SPECIMEN

RELATED APPLICATION

This application claims priority to U.S. Provisional Patent Application Ser. No. 62/288,381 entitled "METHODS AND APPARATUS FOR CHARACTERIZING A SPECIMEN CONTAINER AND SPECIMEN" filed on Jan. 28, 2016, the disclosure of which is hereby incorporated by reference in its entirety herein.

FIELD

The present invention relates to methods and apparatus for testing of a biological specimen, and, more particularly to methods and apparatus for characterizing a specimen container and its contents.

BACKGROUND

Automated testing systems may conduct clinical chemistry or assays using one or more reagents to identify an analyte or other constituent in a biological specimen such as urine, blood serum, blood plasma, interstitial liquid, cerebrospinal liquids, and the like. For convenience and safety reasons, these specimens may be contained in specimen containers (e.g., blood collection tubes). The assay or test reactions generate various changes that may be read and/or otherwise manipulated to determine a concentration of analyte or other constituent present in the specimen.

Improvements in automated testing technology have been accompanied by corresponding advances in pre-analytical sample preparation and handling operations such as batch preparation, centrifugation of specimen to separate specimen constituents, cap removal to facilitate specimen access, and the like by automated pre-analytical specimen preparation systems, which may be part of a Laboratory Automation System (LAS). The LAS may automatically transport the specimens contained in specimen containers on carriers to a number of pre-analytical specimen processing stations, as well as to analytical stations containing clinical chemistry analyzers and/or assay instruments (collectively referred to as "analyzers" herein).

LASs may handle any number of different specimens contained in barcode-labeled specimen containers at one time. The LAS may handle all different sizes and types of specimen containers, and they may also be intermingled. The barcode label may contain an accession number that may be correlated to demographic information that may be entered into a hospital's Laboratory Information System (LIS) along with test orders and other information. An operator may place the barcode-labeled specimen containers onto the LAS system, such as in a rack, and the LAS system may automatically transport the specimen containers for pre-analytical operations such as centrifugation, decapping, and aliquot preparation, and the like; all prior to the specimen actually being subjected to clinical analysis or assaying by the one or more analyzers that may be part of the LAS. In some cases, the one or more barcode labels may be adhered to the specimen container obscuring views of the specimen from some viewpoints.

For certain tests, an amount of a serum or plasma portion of the specimen obtained from whole blood by fractionation (e.g., centrifugation) may be aspirated and used. A gel separator may be added to the specimen container to aid in the separation of a settled blood portion from the serum or plasma portion in some cases. After fractionation and a subsequent de-capping process, the specimen container may be transported to an appropriate analyzer that may extract via aspiration, serum or plasma portion from the specimen container and combine the serum or plasma portion with one or more reagents in a reaction vessel (e.g., cuvette). Analytical measurements may then be performed, often using a beam of interrogating radiation, for example, or by using photometric or fluorometric absorption readings, or the like. The measurements allow for the determination of end-point or rate or other values, from which a concentration of analyte or other constituent may be determined using well-known techniques.

Unfortunately, the presence of certain interferents or artifacts in the specimen, as a result of sample processing or patient disease condition, may possibly adversely affect the accuracy of the test results of the analyte or constituent measurement obtained from the analyzer. For example, the presence of hemolysis, icterus, and/or lipemia (hereinafter HIL) may affect specimen testing results. Likewise, a clot in the specimen (e.g., a blood clot), which may be unrelated to the patient disease state, may cause a different interpretation of the disease condition of the patient. Further, aspiration of a clot may present other problems such as contamination or shut down time for cleaning. Presence of bubbles and/or foam may also cause a different interpretation of the disease condition of the patient via possible aspiration of air.

In the prior art, the integrity of the serum or plasma portion of the specimen may be visually inspected by a skilled laboratory technician. This may involve a review of the color of the serum or plasma portion of the specimen for the presence of HIL and visual examination for clots, bubbles, and foam. A normal (hereinafter "N") serum or plasma portion has a light yellow to light amber color, and may be free of clots, bubbles, and foam. However, visual inspection is very subjective, labor intensive, and fraught with the possibility of human error.

Because manual inspection includes the problems listed above, it is becoming increasingly important to evaluate the integrity of the specimen without the use of visual inspection by a laboratory technician, but by using an automated pre-inspection or screening method to the extent practical. The screening method is carried out prior to analysis at an analyzer. However, in some instances, the one or more barcode label(s) adhered directly to the specimen container may partially occlude the view of the specimen, so that there may not be clear opportunity to visually observe the serum or plasma portion of the specimen via normal automated screening processes.

In some systems, such as those described in U.S. Pat. No. 9,322,761 to Miller, it is described that rotating the specimen container enables the finding of a view window that is unobstructed by the label(s). Imaging may take place upon finding the view window. However, such systems may be less prone to ease of automation.

Because of problems encountered when different sized specimen containers are used in the LAS, as well as when HIL or an artifact such as a clot, bubble, or foam is present in a specimen to be analyzed, there is an unmet need for a method and apparatus adapted to readily and automatically image and analyze such specimens, such as in LASs. The method and apparatus should not appreciably adversely affect the speed at which analyzer test results are obtained. Furthermore, the method and apparatus should be able to be used even on labeled specimen containers, where one or more labels occlude a view of at least some portion of the specimen.

SUMMARY

According to a first aspect, a quality check module is provided. The quality check module includes an imaging location within the quality check module configured to receive a specimen container containing a specimen, one or more cameras located at one or more viewpoints adjacent to the imaging location, and a spectrally-switchable light source including a light panel assembly located adjacent to the imaging location and configured to provide lighting for the one or more cameras, the spectrally-switchable light source configured to be operatively switchable between multiple different spectra.

In another aspect, a quality check module is provided. The quality check module includes an imaging location within the quality check module configured to receive a specimen container containing a specimen, a plurality of cameras arranged at multiple viewpoints around the imaging location, and a plurality of spectrally-switchable light sources each including a light panel assembly located adjacent the imaging location and configured to provide lighting for the plurality of cameras, the plurality of spectrally-switchable light sources configured to be switchable between multiple different spectra.

According to another aspect, a method of imaging a specimen container and/or a specimen is provided. The method includes providing a specimen container containing a specimen at an imaging location, providing one or more cameras configured to capture images at the imaging location, providing one or more light panel assemblies configured to provide illumination for the one or more cameras, Illuminating the imaging location with the one or more light panel assemblies, and capturing multiple images of the specimen container and specimen with the one or more cameras at multiple different spectra.

According to yet another aspect, a specimen testing apparatus specimen is provided. The specimen testing apparatus includes a track, a carrier on the track that is configured to contain the specimen container, a quality check module on the track, the quality check module including: an imaging location within the quality check module configured to receive a specimen container containing a specimen, one or more cameras located at one or more viewpoints adjacent to the imaging location, and one or more spectrally-switchable light sources each including a light panel assembly located adjacent the imaging location and configured to provide lighting for the one or more cameras, the one or more spectrally-switchable light sources configured to be switchable between multiple different spectra.

Still other aspects, features, and advantages of the present invention may be readily apparent from the following description by illustrating a number of example embodiments and implementations, including the best mode contemplated for carrying out the present invention. The present invention may also be capable of other and different embodiments, and its several details may be modified in various respects, all without departing from the scope of the present invention. Accordingly, the drawings and descriptions are to be regarded as illustrative in nature, and not as restrictive. The invention is to cover all modifications, equivalents, and alternatives falling within the scope of the appended claims.

BRIEF DESCRIPTION OF THE DRAWINGS

The drawings, described below, are for illustrative purposes only and are not necessarily drawn to scale. The drawings are not intended to limit the scope of the invention in any way.

DETAILED DESCRIPTION

Figure 1:
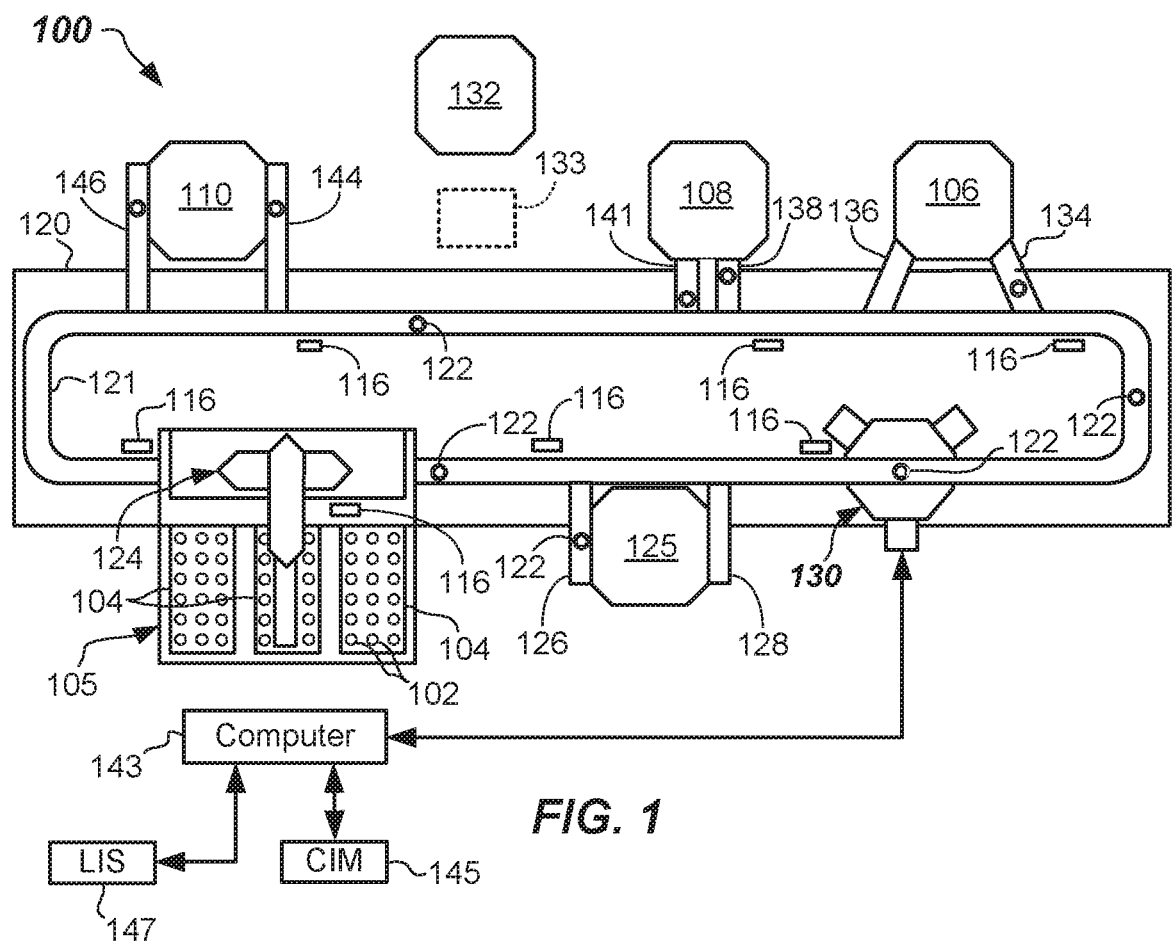
FIG. 1 illustrates a top schematic view of a specimen testing apparatus including one or more quality check modules and one or more analyzers according to one or more embodiments.

In a first broad aspect, embodiments of the present invention provide methods and apparatus adapted to image and to characterize a specimen contained in a specimen container. In one or more embodiments, the end result of the characterization method may be the quantification of the specimen contained in the specimen container. For example, the quantification may include characterizing the volume or depth of the serum or plasma portion, and/or the volume or depth of the settled blood portion of a fractionated specimen.

These values may be used in later processing to determine if sufficient volume of the serum or plasma portion are present for the ordered testing, for determining disease state of the patient (e.g., a ratio between the serum or plasma portion and the settled blood portion), for more exact probe tip placement, and/or may be used to avoid contact or crashes of a robot gripper or probe tip with the specimen container during maneuvers with the robot.

Furthermore, according to one or more embodiments, the present invention may be used to determine characteristics of the specimen container. For example, dimensional characteristics of the specimen container may be determined, such as height and width. These dimensional characteristics may be used to properly guide the positioning of the probe (otherwise referred to as a "pipette"), during a subsequent aspiration and may be used in the volume calculations.

In some embodiments, the characterizing method may be used for making a determination of the presence of an interferent, such as the presence of hemolysis (H), icterus (I), and/or lipemia (L) in the serum or plasma portion of the specimen. Additionally, or optionally, the method may be used to determine if an artifact (e.g., clot, bubble, or foam) is present in the serum or plasma portion.

The specimen, as described herein, is collected in a specimen container, such as a blood collection tube, and may include a settled blood portion and a serum and plasma portion after separation (e.g., fractionation using centrifugation). The settled blood portion is made up blood cells such as white blood cells (leukocytes), red blood cells (erythrocytes), and platelets (thrombocytes), which are aggregated and separated from the serum or plasma portion. The settled blood portion is generally found at the bottom part of the specimen container. The serum or plasma portion is the liquid component of blood that is not part of the settled blood portion. It is generally found above the settled blood portion. Plasma and serum differ primarily in the content of coagulating components, primarily fibrinogen. Plasma is the un-clotted liquid, whereas serum refers to blood plasma that has been allowed to clot, either under the influence of endogenous enzymes or exogenous components. In some specimen containers, a small gel separator (e.g. plug) may be used, which positions itself between the settled blood portion and the serum or plasma portion during fractionation. It serves as a barrier between the two portions.

In accordance with one or more embodiments, the characterization method may be carried out as a pre-analytical testing or screening method. For example, in one or more embodiments, the characterization method may be carried out prior to the specimen being subjected to analysis (clinical chemistry or assaying) on one or more analyzers. In particular, one or more embodiments of the present invention provides for characterization of the specimen as a prerequisite for further testing. In one or more embodiments, the characterization of the specimen may be determined at one or more quality check modules including one or more cameras arranged to provide lateral 2D images of the specimen container and specimen from one or more different lateral viewpoints. During image generation, the specimen container and specimen may be illuminated. The illumination may be by one or more light panel assemblies. In particular, the illumination may be by provided by back lighting with one or more light panel assemblies in some embodiments. In others, the illumination may be by provided by front lighting or even side lighting with one or more light panel assemblies.

In one or more embodiments, the characterization of the specimen and/or specimen container may be carried out using back lighting with the panelized light sources and high dynamic range (HDR) image processing. The method may quantify the specimen, including the location of the interface boundaries of the serum or plasma portion and/or the settled blood portion, as well as the volume or depth of these components with great precision using HDR image processing.

The back illuminated, 2D data sets for the multiple viewpoints may be used to characterize the specimen container and/or specimen. The 2D data sets obtained with back lighting with the panelized light sources may also be used to determine or verify information about the specimen, such as if an artifact (e.g., clot, bubble, foam) is present, and/or to determine whether an interferent, such as hemolysis, icterus, and/or lipemia (hereinafter "HIL") is present in the specimen.

In other embodiments, the method including back lighting with the panelized light sources may be used to identify or verify other characteristics of the specimen container, such as the container type (via identification of height and width thereof), and may further characterize the cap type, and/or the cap color.

If after characterization by the method, the serum or plasma portion is found to contain an artifact (e.g., an identified clot, bubble, or foam) or one or more of H, I, or L, the specimen may be subjected to further processing. For example, an identified clot, bubble, or foam may be taken to another station (e.g., a remote station) for removal of the clot, bubble, or foam by an operator, for further processing, or for additional characterization of indexes for, H, I, or L. After such further processing, the specimen may be allowed, in some embodiments, to continue on and undergo routine analysis by the one or more analyzers. In other cases, the specimen may be discarded and redrawn. If the pre-screening finds that the specimen is normal (N), then the specimen may be directly routed to undergo the ordered analysis by one or more analyzers.

In one or more embodiments, one or more quality check modules are configured to carry out the image capture. The one or more quality check modules may be provided as part of the LAS where a track transports the specimen to one or more analyzers, and the one or more quality check modules may be provided at any suitable location on, or along, the track. In a specific embodiment, a quality check module is provided on or adjacent to the track and includes back lighting with the panelized light sources. For example, quality check module may be located at a loading station, or elsewhere along the track, so that the specimen and specimen container can be characterized while residing on the track. However, to be clear, the quality check module including back lighting may not include a track and the specimen container including specimen may be loaded and unloaded therefrom either manually or by a robot gripper.

The characterization may be accomplished in one or more embodiments by using HDR data processing by capturing multiple images at the one or more quality check modules including back lighting and image capture at multiple exposures (e.g., exposure times) and with illumination with multiple different spectra (e.g., sources having different nominal wavelengths). The images may be obtained using multiple cameras arranged to take the images from different viewpoints, and may be produced using panelized back illumination for each viewpoint in some embodiments. Each of the images may be taken using illumination with multiple different spectra (e.g., colors) by using different light sources in the panelized light sources. For example, red light sources, green light sources, and blue light sources may be used for illumination. Optionally, white light, near-infrared (NIR), infrared (IR), or ultraviolet (UV) light sources may be used.

Images at multiple exposure times for each spectra (wavelength range) may be obtained at the one or more quality check modules. For example, 4-8 images at different exposure times may be obtained at each spectra (wavelength range). These multiple images may then be further processed by a computer to generate characterization results.

Further details of the inventive characterization methods, quality check modules, and specimen testing apparatus including one or more quality check modules will be further described with reference to FIGS. 1-7 herein.

Figure 2:
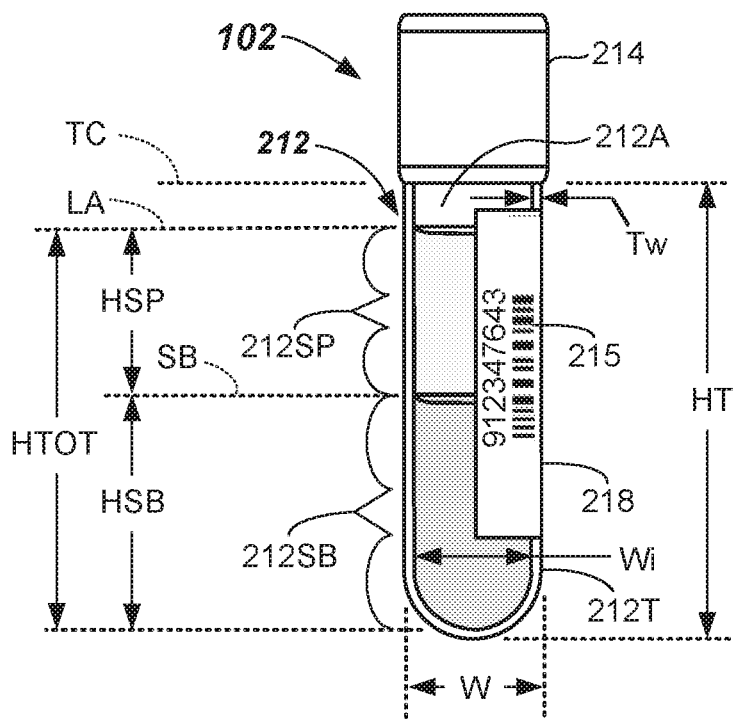
FIG. 2 illustrates a side view of a specimen container including a specimen, one or both of which may be characterized using a method according to one or more embodiments.
Figure 3:
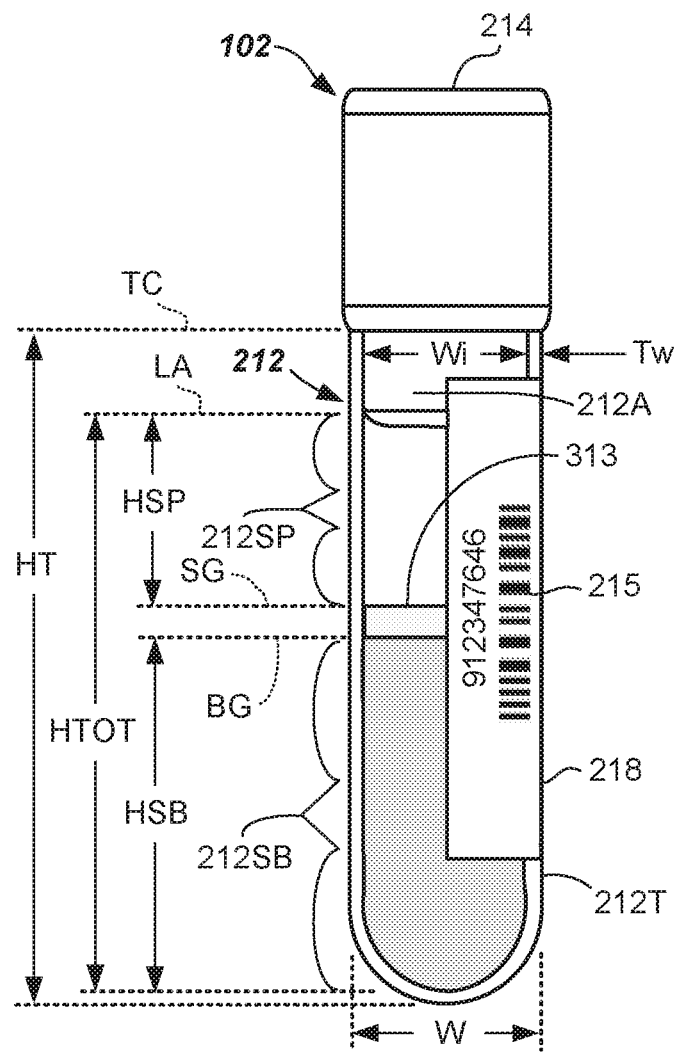
FIG. 3 illustrates a side view of a specimen container including a specimen and a gel separator, wherein one or both of the specimen and specimen container may be characterized using a method according to one or more embodiments.

FIG. 1 shows a specimen testing apparatus 100 capable of automatically processing multiple ones of the specimen containers 102 (e.g., specimen collection tubes—see FIGS. 2 and 3). The specimen containers 102 may be contained in one or more racks 104 at a loading area 105 prior to transportation to, and analysis by, one or more analyzers (e.g., first, second, and third analyzer 106, 108, 110, respectively, arranged about the specimen testing apparatus 100). It should be apparent that more or less numbers of analyzers can be used. The analyzers may be any combination of clinical chemistry analyzers and/or assaying instruments, or the like. The specimen containers 102 may be any generally transparent or translucent container, such as a blood collection tube, test tube, sample cup, cuvette, or other generally clear glass or plastic container configured to contain a specimen 212.

Typically, a specimen 212 (FIGS. 2 and 3) to be automatically processed may be provided to the specimen testing apparatus 100 in the specimen containers 102, which may be capped with a cap 214 (FIGS. 2 and 3—otherwise referred to as a "stopper"). The caps 214 may have different shapes and/or colors (e.g., red, royal blue, light blue, green, grey, tan, or yellow, or combinations of colors), which may have meaning in terms of what test the specimen container 102 is used for, the type of additive contained therein, or the like. Other colors may be used. According to one aspect, it may be desirable to image the cap 214 to characterize information about the cap 214 so that it can be used to cross check with test orders to ensure the right specimen container 102 was used for the ordered test.

Each of the specimen containers 102 may be provided with identification information 215 (i.e., indicia), such as a barcode, alphabetic, numeric, alphanumeric, or combination thereof that may be machine readable at various locations about the specimen testing apparatus 100. The identification information 215 may indicate, or may otherwise be correlated, via a Laboratory Information System (LIS) 147, to a patient's identification as well as tests to be accomplished upon the specimen 212, or other information from the LIS system 147, for example. Such identification information 215 may be generally provided on a label 218 adhered to, or otherwise provided on the side of, the specimen container 102. The label 218 generally does not extend all the way around the specimen container 102, or all along a height of the specimen container 102. In some embodiments, multiple labels 218 may be adhered, and may slightly overlap each other. Accordingly, although the label 218 may occlude a view of some portion of the specimen 212, some portion of the specimen 212 may still be viewable from certain viewpoints. In some embodiments, the racks 104 may have additional identification information thereon. One or more embodiments of the method and quality check module enable the characterization of the specimen 212 without rotation of the specimen container 102.

As best shown in FIGS. 2 and 3, the specimen 212 may include a serum or plasma portion 212SP and a settled blood portion 212SB contained within the tube 212T. Air 212A may be provided above the serum and plasma portion 212SP and the line of demarcation between the air 212A and the serum and plasma portion 212SP is defined herein as the liquid-air interface (LA). The line of demarcation between the serum or plasma portion 212SP and the settled blood portion 212SB is defined herein as the serum-blood interface (SB), as is shown in FIG. 2. The interface between the air 212A and the cap 214 is referred to herein as the tube-cap interface (TC). The height of the serum or plasma portion 212SP is (HSP) and is defined as the height from the top of the serum or plasma portion 212SP to the top of the settled blood portion 212SB, i.e., from LA to SB in FIG. 2. The height of the settled blood portion 212SB is (HSB) and is defined as the height from the bottom of the settled blood portion 212SB to the top of the settled blood portion 212SB at SB in FIG. 2. HTOT in FIG. 2 is the total height of the specimen 212 and HTOT=HSP+HSB.

In cases where a gel separator 313 is used (see FIG. 3), the height of the serum or plasma portion 212SP is (HSP) and is defined as the height from the top of the serum or plasma portion 212SP at LA to the top of the gel separator 313 at SG, i.e., from LA to SG in FIG. 3. The height of the settled blood portion 212SB is (HSB) and is defined as the height from the bottom of the settled blood portion 212SB to the bottom of the gel separator 313 at BG in FIG. 3. HTOT in FIG. 3 is the total height of the specimen 212 and is defined as HTOT=HSP+HSB+height of the gel separator 313 as shown in FIG. 3. In each case, the wall thickness is Tw, the outer width is W, and the inner width of the specimen container 102 is Wi. The height of the tube (HT) is defined herein as the height from the bottom-most part of the tube 212T to the bottom of the cap 214.

In more detail, specimen testing apparatus 100 may include a base 120 (e.g., a frame or other structure) upon which a track 121 may be mounted or rest. The track 121 may be a railed track (e.g., mono or multiple rail tracks), a collection of conveyor belts, conveyor chains or links, moveable platforms, or any other suitable type of conveyance mechanism. Track 121 may be circular, serpentine, or any other suitable shape and may be a closed track (e.g., endless track) in some embodiments. Track 121 may, in operation, transport individual ones of the specimen containers 102 to destination locations spaced about the track 121 in carriers 122 (a few labeled).

Carriers 122 may be passive, non-motored pucks that may be configured to carry a single specimen container 102 on the track 121, where the track 121 is moveable. Optionally, carrier 122 may be automated including an onboard drive motor, such as a linear motor that is programmed to move about the track 121 and stop at pre-programmed locations, where the track 121 is stationary. In either case, the carriers 122 may each include a holder 122H (FIG. 4A) configured to hold the specimen container 102 in a defined, generally upright position. The holder 122H may include a plurality of fingers or leaf springs that secure the specimen container 102 in the carrier 122, but are laterally moveable or flexible to accommodate for different sizes of specimen containers 102 to be received therein. In some embodiments, carriers 122 may exit from the loading area 105 having one or more racks 104 staged thereat. In some embodiments, loading area 105 may serve a dual function of allowing offloading of the specimen containers 102 from the carriers 122 after analysis thereof is completed. Otherwise, a suitable offloading lane (not shown) may be provided elsewhere on the track 121.

A robot 124 may be provided at the loading area 105 and may be configured to grasp the specimen containers 102 from the one or more racks 104 and load the specimen containers 102 onto the carriers 122, such as on an input lane or other location of the track 121. Robot 124 may also be configured and operable to remove specimen containers 102 from the carriers 122 upon completion of testing. The robot 124 including one or more (e.g., at least two) robot arms or components capable of X and Z, Y and Z, X, Y, and Z, r and theta, or r, theta, and Z motion. Robot 124 may be a gantry robot, an articulated arm robot, an R-theta robot, or other suitable robot wherein the robot 124 may be equipped with robotic gripper fingers that may be sized to pick up and place the specimen containers 102.

Upon being loaded onto track 121, the specimen containers 102 carried by carriers 122 may, in some embodiments, progress to a centrifuge 125 (e.g., a device configured to carry out fractionation of the specimen 212). Carriers 122 carrying specimen containers 102 may be diverted to the centrifuge 125 by inflow lane 126 or a suitable robot (not shown). After being centrifuged, the specimen containers 102 may exit on outflow lane 128, or otherwise be moved by the robot, and continue on the track 121. In the depicted embodiment, the specimen container 102 in carrier 122 may next be transported to a quality check module 130 in accordance with one embodiment of the invention to be further described with reference to FIGS. 4A-4C herein.

The quality check module 130 is configured and adapted to characterize the specimen 212 contained in the specimen container 102, and may be adapted to characterize the specimen container 102 in some embodiments. Quantification of the specimen 212 may take place at the quality check module 130 and may include determination of HSP, HSB, or even HTOT, and may include determination of location of LA, SB and/or SG, and/or BG). The quality check module 130 may also be configured for determining a presence of an interferent, such as one or more of hemolysis (H), icterus (I), and/or lipemia (L) contained in a specimen 212. In some embodiments, the specimen 212 may also be tested for the presence of an artifact (e.g., clot, bubble, or foam) at the quality check module 130. In some embodiments, quantification of the physical attributes of the specimen container 102 may take place at the quality check module 130 such as determining HT, tube outer width (W) and/or tube inner width (Wi), TC, or even cap color or cap type.

Once the specimen 212 is characterized, the specimen 212 may be forwarded to be analyzed in the one or more analyzers (e.g., first, second, and third analyzers 106, 108, and/or 110) before returning each specimen container 102 to the loading area 105 for offloading.

Additionally, one or more remote stations 132 may be provided on the specimen testing apparatus 100 even though the remote station 132 is not directly linked to the track 121. For instance, an independent robot 133 (shown dotted) may carry specimen containers 102 containing specimens 212 to the remote station 132 and return them after testing/processing. Optionally, the specimen containers 102 may be manually removed and returned. Remote station 132 may be used to test for certain constituents, such as a hemolysis level, or may be used for further processing, such as to lower a lipemia level through one or more additions, or to remove a clot, bubble or foam, for example. Other testing or processing may be accomplished on remote station 132. For example, another quality check module 130 may be located at the remote station 132. Furthermore, additional stations (not shown), including additional quality check modules 130, may be arranged around the track 121 at various desirable locations, such as a de-capping station, or the like.

The specimen testing apparatus 100 may include sensors 116 at one or more locations around the track 121. Sensors 116 may be used to detect a location of specimen containers 102 along the track 121 by means of reading the identification information 215 (FIG. 2) placed on the specimen container 102, or like information (not shown) provided on each carrier 122. In some embodiments, a barcode may be provided on the carrier 122. Optionally, a distinct RFID chip may be embedded in each carrier 122 and conventional barcode reader or RFID reader may be employed in the tracking operation, for example. Other means for tracking the location of the carriers 122 may be used, such as proximity sensors. All of the sensors 116 may interface with the computer 143 so that the location of each specimen container 102 may be known at all times.

Centrifuge 125 and each of the analyzers 106, 108, 110 may be generally equipped with robotic mechanisms and/or inflow lanes (e.g., inflow lanes 126, 134, 138, 144) configured to remove carriers 122 from the track 121, and robotic mechanisms and/or outflow lanes (e.g., outflow lanes 128, 136, 141 and 146) configured to reenter carriers 122 onto the track 121.

Specimen testing apparatus 100 may be controlled by the computer 143, which may be a microprocessor-based central processing unit (CPU), having a suitable memory and suitable conditioning electronics, drivers, and software for operating the various components. Computer 143 may be housed as part of, or separate from, the base 120. The computer 143 may operate to control movement of the carriers 122 to and from the loading area 105, motion about the track 121, and motion to and from the centrifuge 125, motion to and from the quality check module 130. Computer 143 may also control operation of the quality check module 130. Computer 143 or a separate computer may control operation of the centrifuge 125, and motion to and from each analyzer 106, 108, 110. Usually a separate computer may control operation of each analyzer 106, 108, 110.

For all but the quality check module 130, the computer 143 may control the specimen testing apparatus 100 according to software, firmware, and/or hardware commands or circuits such as those used on the Dimension® clinical chemistry analyzer sold by Siemens Healthcare Diagnostics Inc. of Tarrytown, N.Y., and such control is typical to those skilled in the art of computer-based electromechanical control programming and will not be further described herein. However, other suitable systems for controlling the specimen testing apparatus 100 may be used. The control of the quality check module 130 may also be provided by the computer 143, but according to an inventive model-based imaging method, as will be described in detail herein.

Embodiments of the present invention may be implemented using a computer interface module (CIM) 145 that allows the user to readily access a variety of status and control display screens. These status and control screens may describe some or all aspects of a plurality of interrelated automated devices used for preparation and analysis of specimens 212. The CIM 145 may be employed to provide information about the operational status of a plurality of interrelated automated devices, as well as information describing the location of any specimen 212 as well as a status of tests to be performed on, or being performed on, the specimen 212. The CIM 145 may thus be adapted to facilitate interactions between an operator and the specimen testing apparatus 100. The CIM 145 may include a display screen adapted to display a menu including icons, scroll bars, boxes, and buttons through which the operator may interface with the specimen testing apparatus 100. The menu may comprise a number of function buttons programmed to display functional aspects of the specimen testing apparatus 100.

Pre-screening the specimen 212 in accordance with one or more aspects of the invention allows accurate quantification of the relative amounts of the serum or plasma portion 212SP and/or the settled blood portion 212SB, and/or determination of a ratio there between. Further, pre-screening may determine physical vertical locations of LA, SB or SG, and/or a bottom-most part of specimen container 102 or another datum. Quantification ensures that the specimen 212 can be stopped from progressing on to the one or more analyzers 106, 108, 110, if there is insufficient amount of serum or plasma portion 212SP available to carry out the ordered tests.

Advantageously, the ability to accurately quantify the physical location of LA and SB or SG may minimize not only the possibility of aspirating air, but also minimize the possibility of aspirating either settled blood portion 212SB or gel separator 313 (if the gel separator 313 is present in the specimen container 102). Thus, clogging and contamination of the specimen aspirating probe used to aspirate serum or plasma portion 212SP for the analyzers 106, 108, 110 or other station may be avoided or minimized in some embodiments.

Figure 4A:
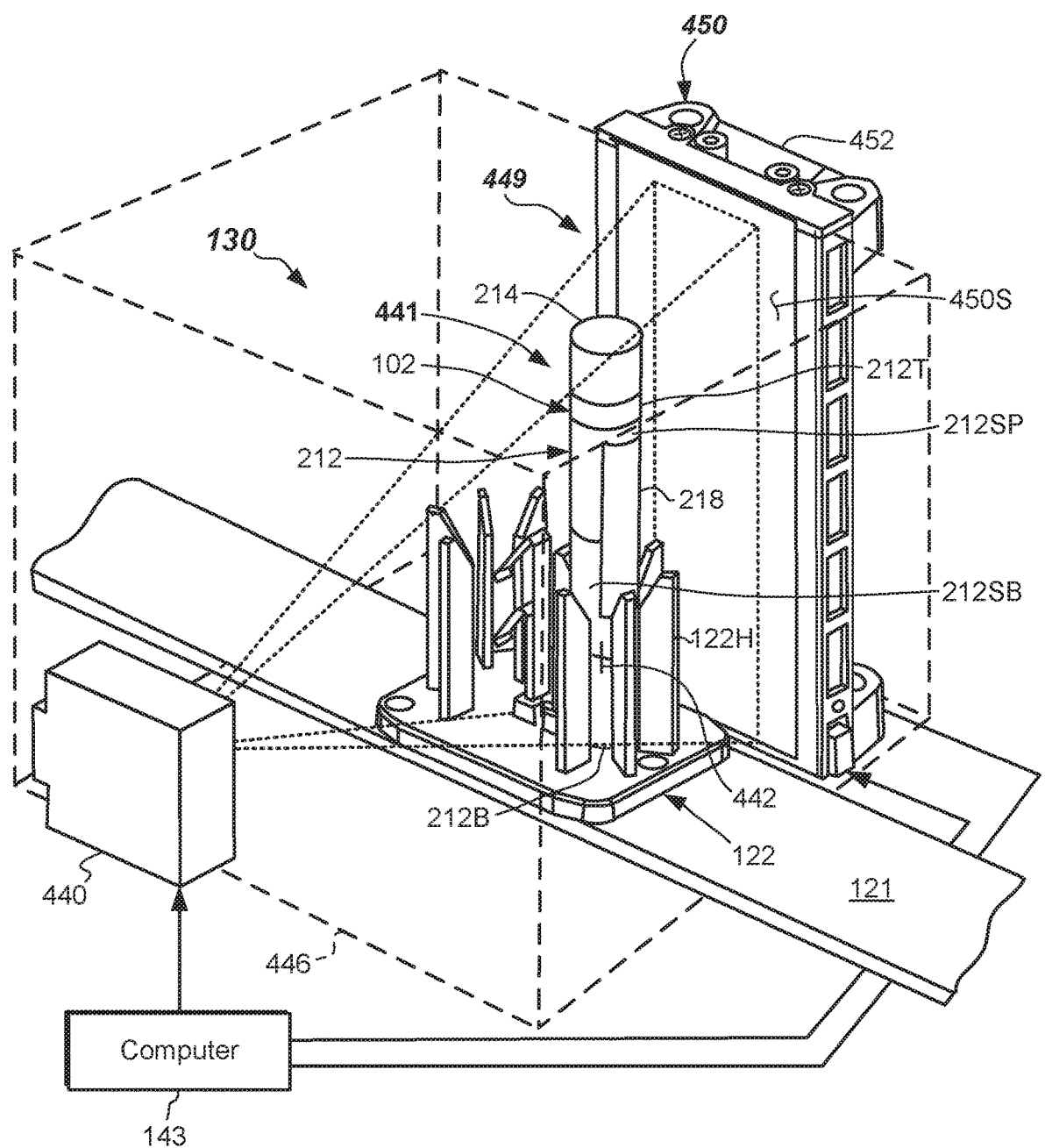
FIG. 4A illustrates an isometric view of a quality check module configured to take and analyze multiple images in order to characterize a specimen and/or specimen container according to one or more embodiments.
Figure 4B:
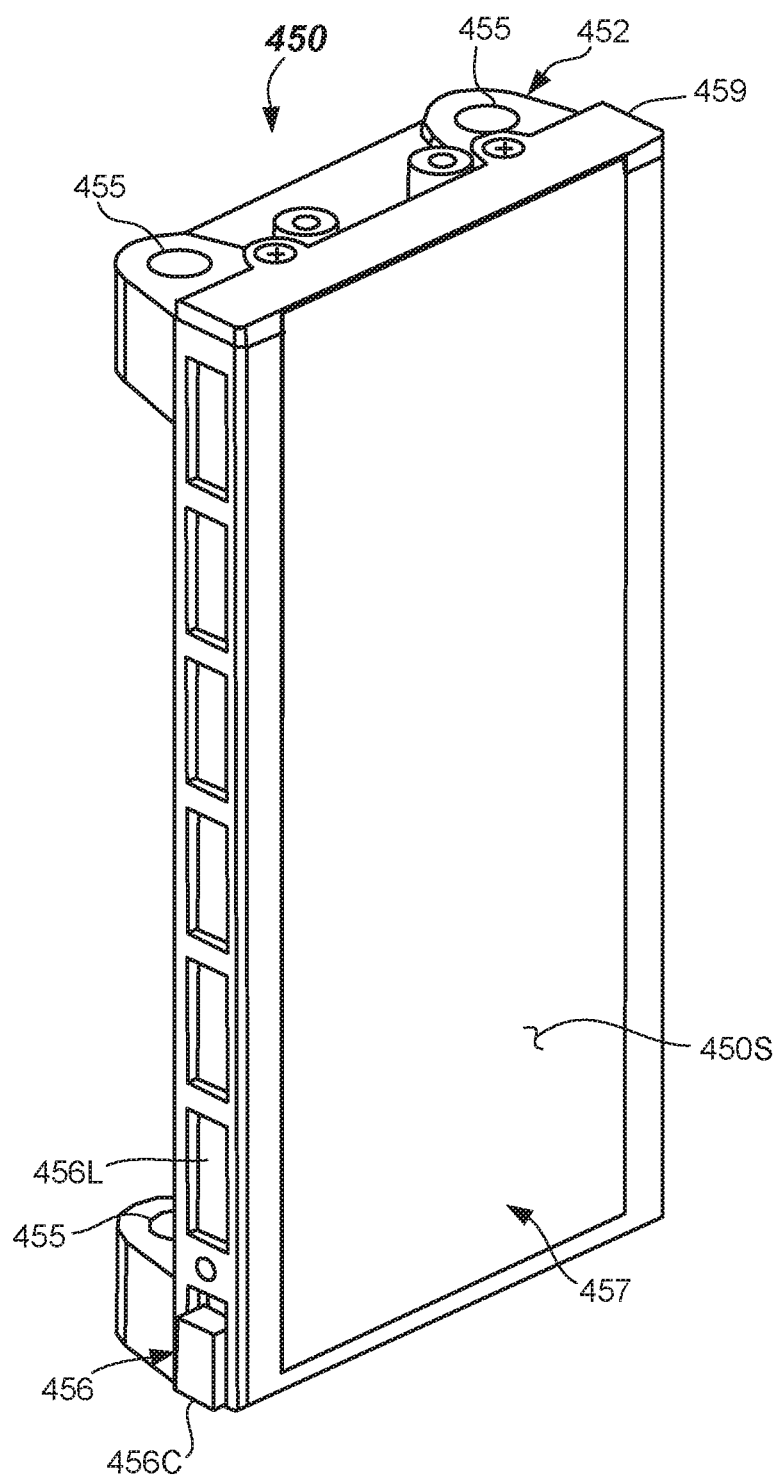
FIG. 4B illustrates an isometric view of a light panel assembly of the quality check module of FIG. 4A according to one or more embodiments.
Figure 4C:
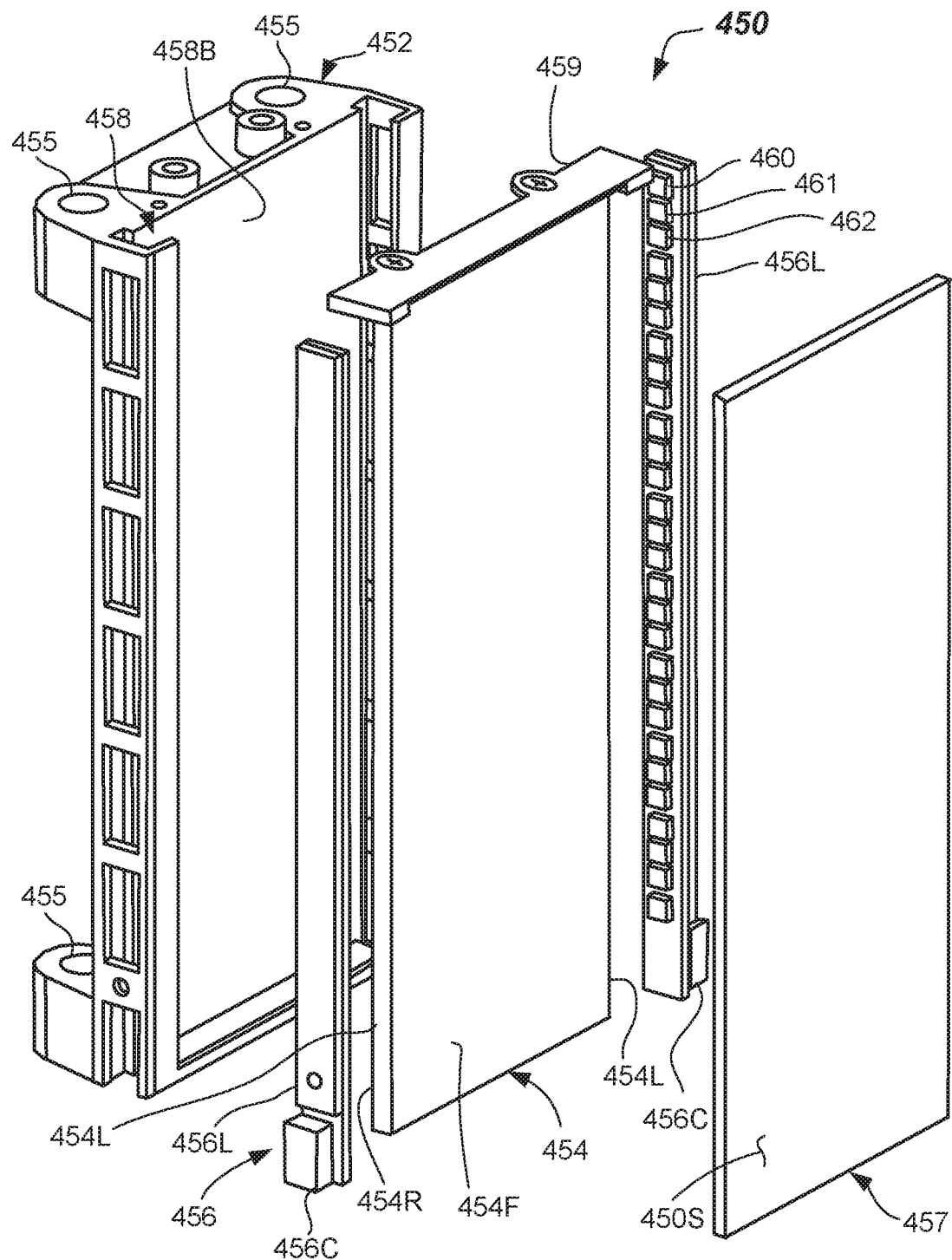
FIG. 4C illustrates an exploded isometric view of various components of a light panel assembly of the quality check module of FIG. 4A according to one or more embodiments.

With reference to FIGS. 4A-4C, a first embodiment of a quality check module 130 including a spectrally-switchable lighting source 449 is provided. The spectrally-switchable lighting source 449 may be embodied as a light panel assembly 450 including switchable light sources, as is shown and described herein. Quality check module 130 may be configured and adapted to automatically characterize and/or quantify the specimen 212 (e.g., the serum or plasma portion 212SP, the settled blood portion 212SB, or both) and/or may quantify the specimen container 102. The information obtained by the quality check module 130 may allow for precise aspiration probe and gripper positioning, determination that a sufficient amount (e.g., volume or height) of the liquid portion (e.g., serum or plasma portion 212SP) is available for the tests ordered, and/or identification of H, I, or L, and/or determining the presence of an artifact (clot, bubble, or foam). Thus, using the quality check module 130 may help avoiding gripper crashes, probe clogging, air aspiration by the probe, identifying HIL and/or an artifact such that valuable analyzer resources are not wasted and that confidence in the test results may be improved.

Now referring to FIG. 4A, a first embodiment of a quality check module 130 is shown. Quality check module 130 may include a camera 440. Camera 440 may be conventional digital camera capable of capturing a digital image (i.e., a pixelated image). However, camera 440 may be a charged coupled device (CCD), an array of photodetectors, one or more CMOS sensors, or the like in some embodiments. The camera 440, in this embodiment, is configured to take images of the specimen container 102 and specimen 212 contained therein from a single lateral viewpoint. The camera 440 may be capable of taking a digital image having any suitable image size. Image size may be 2560 pixels×694 pixels, for example. In another embodiment, the camera 440 may have an image size of 1280 pixels×384 pixels. Other pixel densities may be used.

The camera 440 may be provided in close proximity to, and trained or focused to capture an image window at an imaging location 441 including an expected location of the specimen container 102. In some embodiments, the specimen container 102 may be placed at or stopped at the imaging location 441, such as by stopping on a track 121 or being placed at the imaging location 441 by a robot, so that it is approximately located in a center of the image window. As configured, the camera 440 can generate images that include portions of the serum or plasma portion 212SP, portions of the settled blood portion 212SB, and some of the cap 214, and the bottom-most portion 212B of the tube 212T or a reference datum 442, for example. The reference datum 442 may aid in quantification of the specimen 212 and determining a vertical location of the specimen container 102 within the view window. Reference datum 442 may be a visible mark or marks (e.g., one or more crosses, rings, etc.) placed on the specimen container 102 in a known vertical location, for example, that can be viewed regardless of the rotational orientation of the specimen container 102 in the holder 122H of the carrier 122.

Referring to FIGS. 4A-4C, the quality check module 130 may include a spectrally-switchable lighting source 449 as an active backdrop, as shown, that may be provided by the light panel assembly 450 to provide spectrally-switchable backlighting. The light panel assembly 450 may include a frame 452, a light guide 454, and a light source 456 operational to cause light emission from a panel front surface 450S. In the depicted embodiment, the light source 456 may emit light into the lateral edges 454L (e.g., the side edges) of the light guide 454, as best shown in FIGS. 4B-4C. The light panel assembly 450 may further include a diffuser 457, where one surface of the diffuser 457 may be the panel front surface 450S of the light panel assembly 450. Other protective films may be used on or in conjunction with the diffuser 457.

The frame 452 may be made of a rigid material, such as plastic, and may include suitable fastening structures, such as bores 455 that are adapted to be mounted onto fixed mounting rods (not shown). Other suitable mounting features may be included for mounting the light panel assembly 450 in a fixed orientation to the imaging location 441. Frame 452 may include a pocket 458 that may include an open front and top and a closed back surface 458B and bottom and that is configured to receive and position the light source 456, the light guide 454, and the diffuser 457 (if used) therein. The light source 456, light guide 454, and diffuser 457 may be inserted into the pocket 458 from the top and secured in place with securement member 459 in some embodiments. Other means for securing the light source 456, light guide 454, and the diffuser 457 in the frame 452 may be used. The light guide 454 may be made of a suitably transparent light guide material including light diffusing capability, such as provided by a plastic sheet including internal light diffusing particles or other means of internal light diffusion. One suitable material is Acrylite LED® EndLighten, a product available from Evonik Industries AG of Essen, Germany. The light guide 454 may be made of a sheet having a width of between about 60 mm and about 150 mm, a height of between about 120 mm and 180 mm, and a thickness of between about 3 mm and about 5 mm, for example. In one embodiment useful for backlighting, the light guide 454 may be made of a sheet having a width of about 60 mm, a height of about 150 mm, and a thickness of about 4 mm, for example. Other suitable sizes may be used.

In the depicted embodiment of FIGS. 4A and 4B, the light guide 454 functions by guiding light emitted laterally into the lateral edges thereof by light arrays 456L (LED strip modules) of the light source 456 through the bulk material of the light guide 454 and emitting light on the front surface 454F and rear surface 454R of the light guide 454 due to light interactions with the light diffusing particles therein. In some embodiments, the rear surface 454R of the light guide 454 may include a highly reflective material formed thereon to reflect or backscatter any light transmission passing towards the back surface 458B and direct it back into the bulk material of the light guide 454 so that it may then be emitted from the front surface 454F. Optionally, a highly reflective material may be provided on the back surface 458B of the frame 452 or as an individual element between the back surface 458B and the light guide 454. The highly-reflective material may be provided by as a mirror or a white plastic element, or other plastic or glass element with a metallic coating of silver, gold, chrome, tin, or combinations, for example. The light emitted from the front surface 454F is radiated substantially uniformly across the entire surface of the light guide 454 and illuminates the specimen container 102 and specimen 212 at the imaging location 441. The highly-reflective material may be advantageous in cases where light emission power of the light panel assembly 450 is to be maximized. In cases where light emission power is not critical, a light absorbing material may be provided on the back surface 458B of the frame 452 or as an individual element between the back surface 458B and the light guide 454 to reduce backscattering of light incident on the front surface of the light panel assembly 450, which may enhance signal quality for optical analysis.

The light source 456 may include light arrays 456L arranged adjacent to both lateral edges 454L of the light guide 454. The light arrays 456L may be LED strip modules including a linear array of individual light source elements (e.g., light emitting diodes—LEDs) arranged linearly along the lateral edges 454L of the light guide 454. The light arrays 456L each may include a plurality of LEDs, such as between about 8 and 80 LEDs, for example, that may be arranged on a circuit board with a connector 456C provided to allow electrical connection to the computer 143. The light arrays 456L may be provided along the respective sides of the pocket 458 and are configured such that the emitting portion of each of the light sources (e.g., LEDs) are provided directly adjacent to the lateral edges 454L, and even touching the lateral edge 454L, if possible.

The light arrays 456L provide switchable multi-spectral illumination. For example, in one embodiment, the light arrays 456L may include a plurality of independently-switchable lighting elements, or lighting elements that may be switchable in groups, such as LEDs that have different light emission spectra. The switching of the lighting elements may be accomplished by software operable on the computer 143 coupled with an appropriate power source and drivers. Thus, the light panel assembly 450 may be illuminated at multiple different spectra by selecting only some of the lighting elements for illumination at a time. For example, LEDs may include different colored LEDs, such as red LEDs 460 (R), green LEDs 461 (G), and blue LEDs 462 (B) that emit light spectra at different nominal wavelengths. The light panel assembly 450 may emit red light at 634 nm±35 nm, green at 537 nm±35 nm and blue at 455 nm±35 nm, for example. In particular, the light arrays 456L may include clusters of R, G & B LEDs 460, 461, 462 that may be repeatedly arranged along the height of the light arrays 456L. High power Oslon SSL model LEDs available from Osram Opto Semiconductors GmbH of Regensburg, Germany may be used, for example. Each of the same-colored LEDs may be illuminated at once. For example, each or the red LEDs 460 may be turned on simultaneously to provide red illumination from the light panel assembly 450 to illuminate the specimen container 102 containing specimen 212 during imaging thereof. Likewise, each of the green LEDs 461 may be turned on simultaneously to provide green illumination during imaging. Similarly, each of the blue LEDs 462 may be turned on simultaneously to provide blue illumination during imaging. It should be recognized that R, G, and B are only examples, and that other spectral light sources may be used, such as UV, NIR, and/or IR. Thus, it should be apparent that the light panel assembly 450 can be configured as a switchable, multi-spectral emitter.

In some embodiments, some of the lighting elements may include white light sources, such that white light (e.g., wavelength range of about 400 nm to about 700 nm) may be selected for certain types of imaging. In other embodiments, UV (wavelength range of about 10 nm to about 400 nm), near infra-red (wavelength range of about 700 nm to about 1200 nm) and IR (wavelength range of about 1200 nm to about 2500 nm) may be included and may be switched on at times for certain types of imaging. Thus, one or more embodiments of light panel assembly 450 may include at least two switchable lighting elements having different emission spectra. In some embodiments, switchable R, G, and B lighting elements are provided. In some embodiments, switchable R, G, B, and white lighting elements are provided. In yet other embodiments, switchable R, G, B, and UV lighting elements are provided. In yet other embodiments, switchable R, G, B, and NIR or IR lighting elements are provided. Any combination of two or more of switchable R, G, B, white, UV, NIR, and IR lighting elements may be provided in the light panel assembly 450. For NIR, an LED having a wavelength of 850 nm±20 nm may be used. In such embodiments, the combination of switchable lighting elements may be provided in equal amounts and generally evenly spaced along the height of the light guide 454.

The light panel assembly 450 may optionally include a diffuser 457 including diffusing properties and may be provided as a sheet of Acrylite® Satince available from EVONIK of Essen, Germany in some embodiments. The OD010 DF colorless was found to work well. The diffuser 457 may be a sheet having height and width dimensions approximately the same as the light guide 454 and a thickness of between about 2 mm and about 4 mm, for example. Other dimensions may be used. The diffuser 457 functions by scattering light passing through it. The diffuser 457 and the light guide 454 may be provided in spaced relationship to one another with a slight gap formed there between. The gap may be, for example, between about 1 mm and about 5 mm, and about 2.4 mm in some embodiments. Other gaps may be used. The quality check module 130 may include a housing 446 (shown dotted) that may at least partially surround or cover the track 121 and the imaging location 441. The housing 446 may be a box-like structure provided to eliminate outside lighting variances.

Figure 4D:
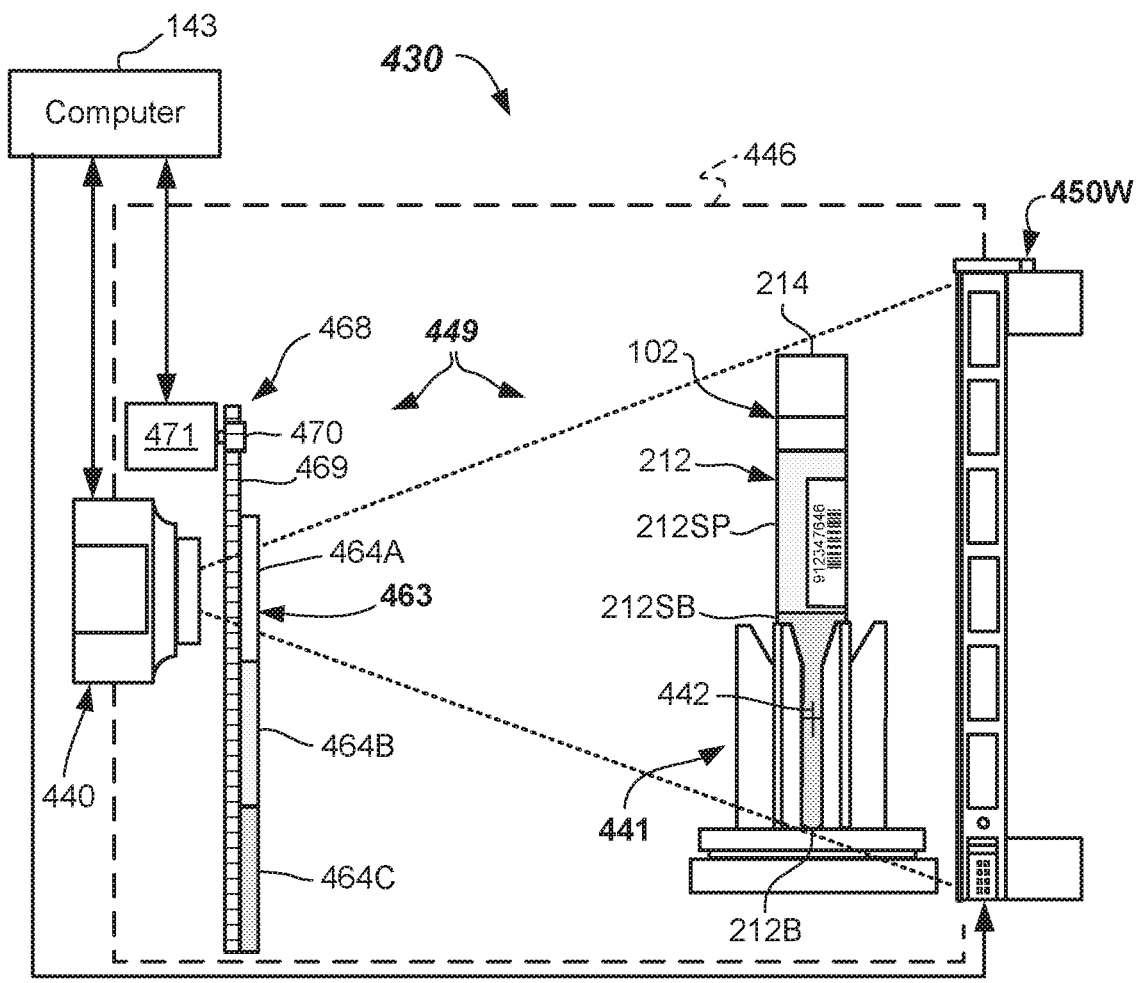
FIG. 4D illustrates a schematic side view of an alternate quality check module including a light panel assembly and a filter assembly according to one or more embodiments.

Another embodiment of quality check module 430 including a light panel assembly 450W is shown and described in FIG. 4D. Quality check module 430 may be configured and adapted to automatically characterize and/or quantify the specimen 212 (e.g., including the serum or plasma portion 212SP, the settled blood portion 212SB, or both) and/or may quantify the specimen container 102 when the specimen 212 is located at the imaging location 441. Quality check module 430 may include a camera 440, as described above, that is configured to take images of the specimen container 102 and specimen 212 from a single lateral viewpoint.

The light panel assembly 450W may be constructed as previously indicated, however in this embodiment the LEDs or lighting elements arranged along the height of the light guide 454 may be white light LEDs or other white light emitting elements. The emitted white light range may be over a wavelength range of about 400 nm to about 700 nm, for example. In this embodiment, the spectrally-switchable light source 449 includes a combination of the light panel assembly 450W and a filter assembly 463 arranged between the camera 440 and the light panel assembly 450W. The filter assembly 463 may be a mechanically-switchable filter assembly where two or more (three as shown) filter elements 464A, 464B, 464C may individually be moved into the view window at selected times. Each of the filter elements 464A, 464B, 464C may be a band-pass filter having a designed wavelength range of light that is allowed to pass through, while other wavelengths outside the range may be effectively blocked. For example, the band-pass range for filter member 464A may be 455 nm±35 nm (e.g., blue), the band-pass range for filter member 464B may be 537 nm±35 nm (e.g., green), and the band-pass range for filter member 464C may be 634 nm±35 nm (e.g., red). Other numbers and/or nominal wavelengths of multiple filter elements may be used. The filter assembly 463 may be moveable in front of the viewing window of the camera 440 by a drive assembly 468 so that each of the filter elements 464A, 464B, 464C can be individually selected to filter the light received from the light panel assembly 450W as transmitted through the specimen container 102 and specimen 212. The drive assembly 468 may include a linear rack 469 attached to and moveable with the filter assembly 463. Suitable bearings or slides may be provided (not shown) to allow the filter assembly 463 to translate smoothly. A pinion or gear 470 may be driven by a motor 471 via control signals from the computer 143 to move the linear rack 469 and the filter assembly 463 to align the various filter elements 464A, 464B, 464C with the camera 440 as selected. Other means for driving the filter assembly 463 may be used, such as a linear motor or even a rotational filter wheel.

Figure 4E:
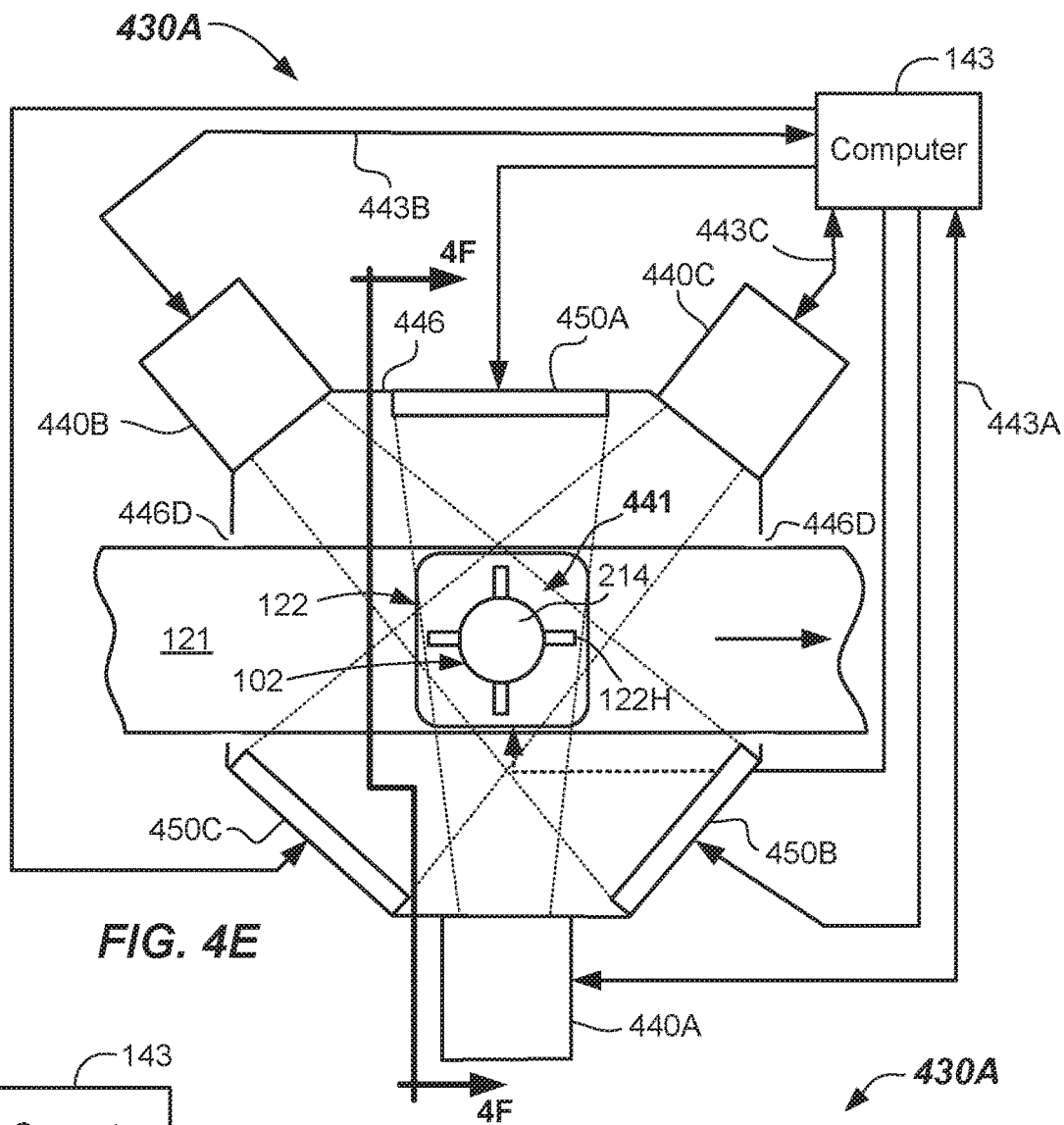
FIG. 4E illustrates a schematic top view (with ceiling removed) of a quality check module including a plurality of cameras and a plurality of light panel assemblies according to one or more embodiments.
Figure 4F:
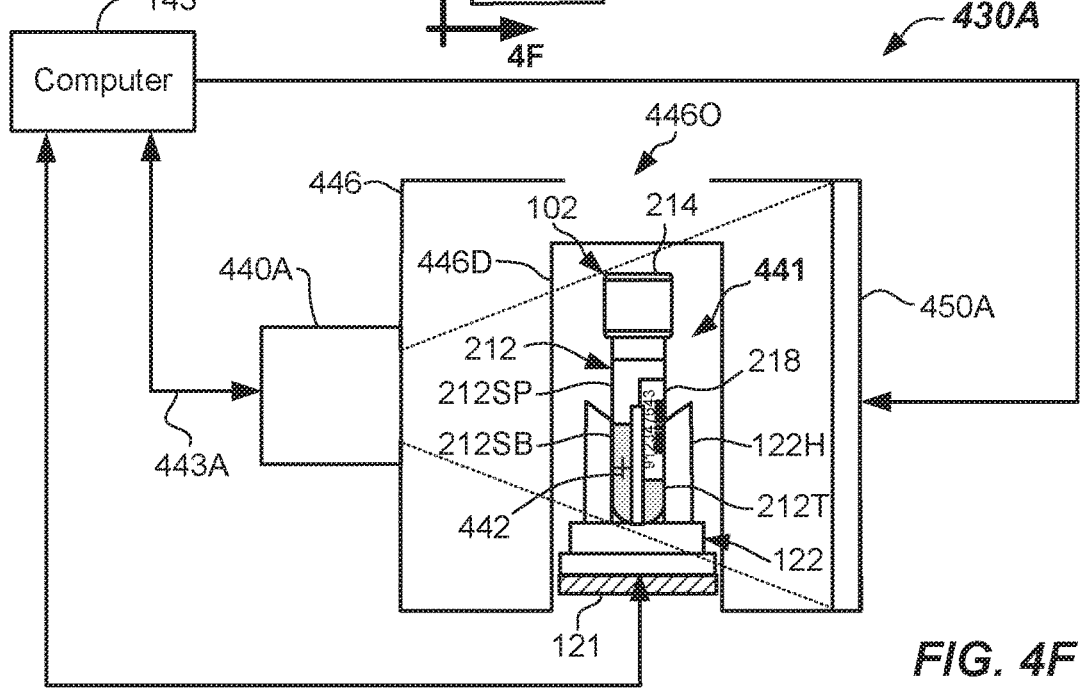
FIG. 4F illustrates a schematic side view of the quality check module of FIG. 4E taken along section line 4F-4F according to one or more embodiments.

With reference to FIGS. 4E-4F, another embodiment of a quality check module 430 including spectrally-switchable lighting sources is shown and described. Quality check module 430 may include multiple cameras 440A-440O and multiple light panel assemblies 450A-450C that are selectively switchable as described above. Quality check module 430A may be configured and adapted to automatically characterize and/or quantify the specimen (e.g., the serum or plasma portion 212SP, the settled blood portion 212SB, or both) and/or physical dimensions of the specimen container 102.

Three cameras 440A-440O are shown in FIG. 4E, but two or more, three or more, or even four or more cameras can be used. To minimize edge distortion, three or more cameras 440A-440C may be used. Cameras 440A-440C may be conventional digital cameras capable of capturing a digital image (i.e., a pixelated image), the same as camera 440 discussed above. For example, three cameras 440A, 440B, 440C are illustrated in FIG. 4E and are configured to take images from multiple (e.g., three) different lateral viewpoints. Each camera 440A, 440B, 440C may be capable of taking a digital image having an image size as discussed above, for example. Pixel as used herein may be a single pixel or a superpixel (collection of closely-grouped multiple pixels). In some instances, processing of the images by computer 143 may be by processing superpixels to lower computational burden.

Each camera 440A-440O may be configured and operable to take multiple lateral images of at least a portion of the specimen container 102 and at least a portion of the specimen 212. For example, the cameras 440A-440O may capture a part of the label 218 or cap 214, part of the tube 212T, and the specimen 212 (see FIGS. 2-3). Eventually, from the multiple images, 2D data sets may be generated by each camera and stored in memory in the computer 143. From these 2D data sets, a composite model of the specimen 212 in the specimen container 102 can be developed. The composite model may be a 3D model in some embodiments, and may be used to make final determinations about the specimen 212, or to confirm determinations made by using the 2D data from the images taken by the individual cameras 440A-440O.

In the embodiment shown, the plurality of cameras 440A-440C are arranged around the imaging location 441 and configured to capture lateral images from multiple viewpoints. The viewpoints may be spaced so that they are approximately equally spaced from one another, such as about 120 degrees from one another, as shown, when three cameras 440A, 440B, 440C are used. As depicted, the cameras 440A-440O may be arranged around the edges of the track 121. Other arrangements and spacing of the plurality of cameras 440A-440O may be used. In this way, the images of the specimen 212 in the specimen container 102 may be taken while the specimen container 102 is residing in the carrier 122. The images may overlap slightly in some embodiments.

In one or more embodiments, the carriers 122 may be stopped at a predetermined location in the quality check module 430A, such as at a point where normal vectors from each camera 440A-440O intersect with each other. In some embodiments, a gate may be provided to stop the carriers 122, so that good quality images may be taken. In other embodiments, the carriers 122 may include a linear motor configured to stop the carrier 122 at desired locations, as programmed, and to move the carrier 122 to the next station on the track 121. In an embodiment where there is a gate at the quality check module 430, one or more sensors (like sensors 116) may be used to determine the presence of a carrier 122 at the quality check module 430A.

The cameras 440A-440C may be provided in close proximity to and trained or focused to capture an image window, i.e., an imaging location including an expected location of the specimen container 102, wherein the specimen container 102 may be stopped so that it is approximately located in a center of the view window. As configured, the cameras 440A-440C can capture images that include portions of the serum or plasma portion 212SP, portions of the settled blood portion 212SB, some or all of the cap 214, and a bottom-most portion of the tube 212T, or a reference datum 442. The reference datum 442 may aid in quantification of the specimen 212. Reference may be made to TC, the bottom-most portion 212B of the specimen container 102, or to the reference datum (e.g., a visible mark placed on the specimen container 102 in a known location), for example.

In operation, each image may be triggered and captured responsive to a triggering signal send by computer and provided in communication lines 443A-443C when the computer 143 receives a signal that the carrier 122 is located at the desired location in the quality check module 430A. Each of the captured images may be processed according to one or more embodiments of the method provided herein. In particular, HDR image processing may be used to capture and process the images in order to characterize the specimen 212 and specimen container 102 with a high level of detail and informational content.

In more detail, multiple spectral images may be captured of the specimen 212 (e.g., specimen 212 separated by fractionation) at the quality check module 430A at multiple different exposures times, at multiple different spectrum (or one or more wavelength ranges), and from different viewpoints. For example, each camera 440A-440C may take 4-8 images at different exposures times and at the multiple spectra.

In one embodiment, the multiple spectral images may be accomplished as back illuminated by using the light panel assemblies 450A-450O. The spectrally-switchable lighting source, embodied as the light panel assemblies 450A-450O, may back light the specimen container 102 as shown in FIGS. 4E-4F and include switchable light sources as described above. Optionally, in another embodiment, the spectrally-switchable light sources may be provided by light panel assemblies 450A-450C that may back light the specimen container 102 with white light between 400 nm and 700 nm, or even broadband light at 400 nm to 2000 nm, and selectable band-pass filters may be used to capture images at multiple selected wavelengths as discussed above, for example. Thus, in each embodiment, the spectrally-switchable lighting source provides multiple emission spectra (e.g., R, G, and B). The capture and use of the multiple color images increases the information content for analysis and may emphasize certain characteristic absorption spectra when imaging at a specific wavelength.

For example, to capture images with illumination at a first spectrum, the red LEDs 460 of each of the light panel assemblies 450A-450C (nominal wavelength of about 634 nm±35 nm) may be used to illuminate the specimen 212 from three lateral locations. The red illumination by the light panel assemblies 450A-450C may be provided as the multiple images (e.g., 4-8 or more images) at different exposure times are captured by each camera 440A-4400. In some embodiments, the exposure times may be between about 0.1 ms and 256 ms. Other exposure times may be used. Each of the respective exposure time images being illuminated with red light for each camera 440A-440C may be taken simultaneously or sequentially and stored in memory in computer 143.

Once the red illuminated images are captured, the red LEDs 460 may be turned off and another spectrum of light, for example, green LEDs 461 may be turned on (nominal wavelength of about 537 nm±35 nm), and multiple images (e.g., 4-8 or more images) at different exposure times may be captured at that spectrum by each camera 440A-440C. This may be repeated with blue LEDs 462 (nominal wavelength of about 455 nm±35 nm) for each camera 440A-4400. In some embodiments, the light panel assemblies 450 may be accomplished via use of white light LEDs or a broadband light source coupled with the use of exchangeable filter assemblies as described with reference to FIG. 4D. The light panel assemblies 450A-4500 may provide homogeneous light emission over the entire field of view of the cameras 440A-440C.

In yet other embodiments, the light panel assemblies 450A-450C may include a light source matrix of individual light sources (e.g., R, G, and B LEDs) provided behind the diffuser 457, each of which may be individually switchable or switchable in color groups. Thus, different colored lighting (e.g., R, G, B and/or a multitude of other colors) can be selectively turned on and off, for example, to illuminate the imaging location 441 at multiple different and selectable spectra of light.

In another embodiment, light panel assemblies 450A-4500 may back light the specimen container 102 with broadband light source (e.g. emission of between about 400 nm and about 2000 nm), and may be used in combination with one or more spectrally-selective cameras (e.g., cameras 440 or 440A-4400). The spectrally-selective cameras (also multispectral or hyperspectral cameras) are suited to generate spectrally-selective images, i.e. multiple images at respective discrete spectra (e.g., R, G, B and/or a multitude of other colors). The spectrally-selective cameras may comprise a spectral filter pattern similar to the Bayer pattern spectral filter of a conventional color camera, but with potentially different wavelength bands or ranges relevant for analysis of serum or plasma portion 212SP. The filter pattern may result in spectral selectivity on the pixel level, e.g. one pixel may be suited to receive light at one nominal wavelength and another pixel may be suited to receive light at a different nominal wavelength. Therefore, using one preferably broadband illumination spectrum, multiple images acquired at multiple respective discreet spectra can be generated. Other means to achieve spectral selectivity of the cameras may be used.

The quality check module 430A may include a housing 446 that may at least partially surround or cover the track 121, and the specimen container 102 and imaging location 441 may be located inside the housing 446 during the image taking phase. Housing 446 may include one or more doors 446D to allow the carriers 122 to enter into and/or exit from the housing 446. In some embodiments, the ceiling may include an opening 4460 to allow a specimen container 102 to be loaded into the carrier 122 by a robot including a gripper adapted to grasp the specimen container 102.

Figure 4G:
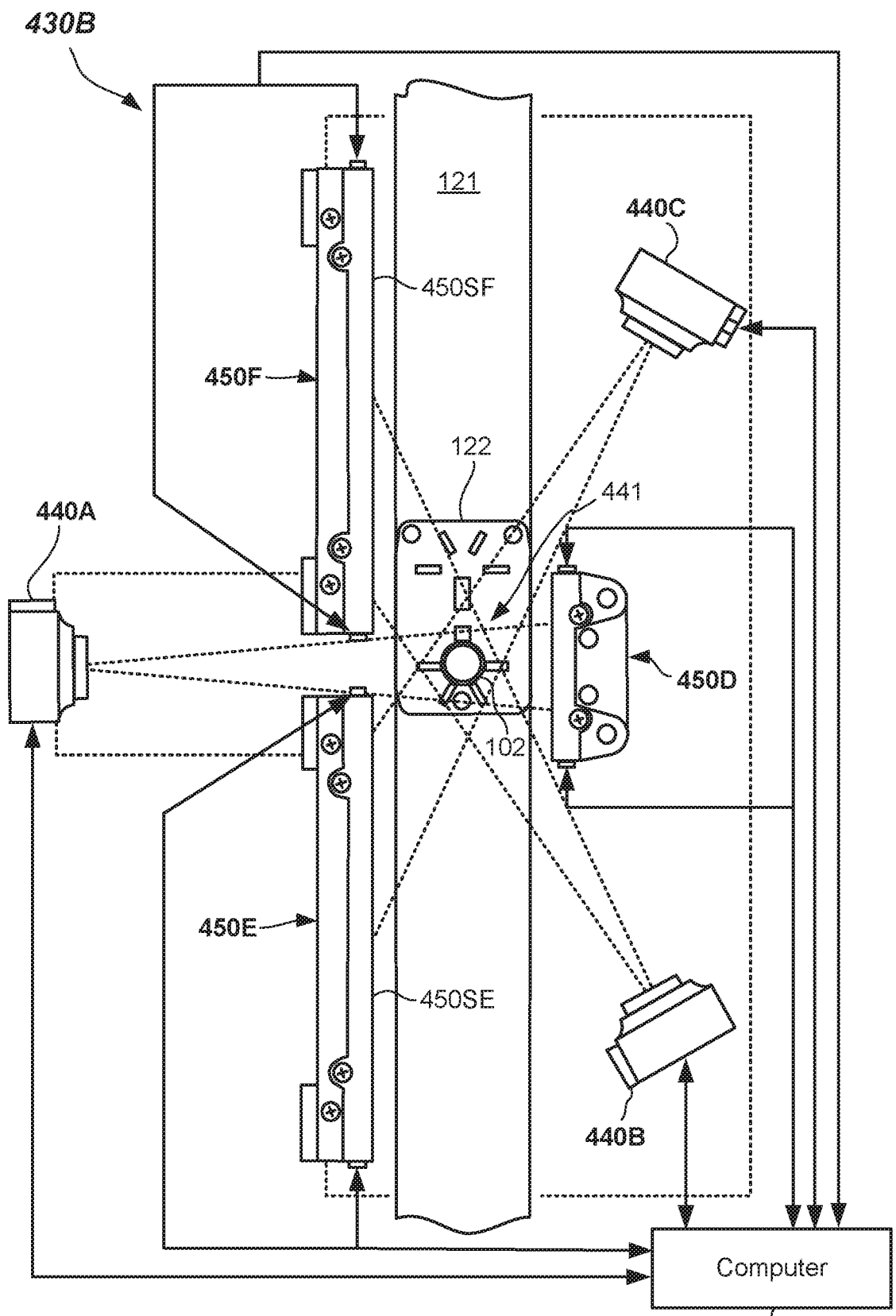
FIG. 4G illustrates a schematic top view of an alternate quality check module including a plurality of light panel assemblies according to one or more embodiments.

In another embodiment, as best shown in FIG. 4G, the specimen container 102 may be illuminated in the quality check module 430B, such as by including light panel assemblies 450D, 450E, and 450F arranged across from the respective cameras 440A-4400. In this embodiment, the cameras 440A-440C may be digital monochrome cameras and the switchable light sources including light panel assemblies 450D, 450E, and 450F may emit selectively switchable nominal wavelengths, such as R, G, and B spectra of approximately 634 nm±35 nm, 537 nm±35 nm, and 455 nm±35 nm, respectively.

In this alternate embodiment, it is possible to achieve multiple illumination modes that may be desirable for different types of characterizations by focusing on transmissive imaging, absorbance imaging, or reflective imaging. For example, with the configuration of FIG. 4G, the imaging location 441 may include frontlit and backlit illumination or various combinations thereof using the light panel assemblies 450D, 450E, and 450F. In the depicted embodiment, the light panel assemblies 450E, 450F are arranged such that the front surfaces 450SE, 450SF are substantially parallel with one another and may be substantially parallel with the direction of the track 121. For example, the light panel assemblies 450E and 450F (with light panel assembly 450D not illuminated) may be used to front illuminate the specimen 212 and specimen container 102 for camera 440A. In some embodiments, the camera 440A may be a monochrome camera and the front lighting may occur during imaging at multiple wavelengths by switching the illumination by the light panel assemblies 450E and 450F between multiple discreet nominal spectrums, such as from red (R) to green (G) to blue (B), and/or other spectra in any order.

In an optional embodiment, the light panel assemblies 450E and 450F may front light the imaging location 441 with white light and the camera 440A may be a color camera. Multiple images at different exposure times may then be taken by camera 440A. Each image taken by camera 440A may be stored in memory of the computer 143 and then separated into color components at multiple wavelengths to provide the captured images at multiple spectra. For example, computer 143 may separate the images into at least three captured wavelengths between about 400 nm and about 700 nm. For example, RGB components at approximately 450 nm, 560 nm, and 635 nm, respectively, may be separated out of the image data stored by the computer 143 to generate the multi-spectral, multi-time exposure captured images for the frontlit viewpoint. Images may be taken, as before, via signals from the computer 143 in lines 443A while being illuminated by the light panel assemblies 450E and 450F. Such frontlit imaging may be suitable for determining color of the cap 214, determining the location of the label 218, reading the barcode, or even for segmentation, i.e., characterization of the different portions of the specimen 212 and specimen container 102.

In another embodiment all three cameras and all three light panel assemblies 450D-450F may be operable and the light panel assemblies 450D-450F may act as back lighting sources for the cameras 440A-440O for transmissive imaging such as for absorbance measurement, such as for HIL detection, artifact detection, or segmentation.

In yet another configuration, the side lighting mode may be provided by the quality check module 430B. The side lighting may be accomplished, for example, by illuminating with light panel assembly 450D and imaging with camera 440B or 440C or both. The illumination mode may be used for turbidity analysis or for determining refractive index of the specimen 212 in the specimen container 102.

For each of the above setups, all of these multiple images taken at multiple exposure times for each respective spectra (e.g., R, G, and B or white light) may be obtained in rapid succession, such that the entire collection of images for the specimen 212 from multiple viewpoints may be obtained in less than about 2 seconds, for example. Other lengths of time may be used.

For example, using the quality check module 130 of FIGS. 4A, 4 different exposure images for each spectra using the camera 440 and back lighting with spectrally-switchable light source 449 comprising light panel assembly 450 will result in 4 images×3 colors×3 cameras=36 images. In another example, using the quality check module 430B of FIGS. 4G, 4 different exposure images using the camera 440A and front lighting with white light sources of the light panel assemblies 450E, 450F will result in 4 images×3 cameras=12 images. However, RGB images may then be captured by the computer 143 by separating the white light images taken into the individual RGB components thereof. Thus, after separation, 36 images are also captured. The 2D image data may be stored in memory of the computer 143 and subsequently further processed thereby.

According to a method of processing the image data, the processing of the image data may first involve, for example, selection of optimally-exposed pixels from the image data of the multiple captured images at the different exposure times and at each spectra, and for each camera 440A-440O (if multiple cameras are used), so as to generate optimally-exposed image data for each spectra (e.g., RGB-colored images) and for each camera 440A-440C. This is referred to as "image consolidation" herein. For each corresponding pixel, for each of the images from each viewpoint, pixels exhibiting optimal image intensity may be selected from each of the different exposure time images. In one embodiment, optimal image intensity may be pixels that fall within a predetermined range (e.g., between 180-230 on a scale of 0-255), for example. In another embodiment, optimal image intensity may be between 16-230 on a scale of 0-255, for example. If more than one pixel in the corresponding locations of two images (from one camera) is determined to be optimally exposed, the higher intensity of the two is selected. Each of the optimally-exposed intensity values is normalized by its respective exposure time. The result is a plurality of normalized and consolidated 2D color image data sets (e.g., R, G, B) for each viewpoint where all of the pixels are optimally exposed (e.g., one image data set per spectra (e.g., R, G, and B) and viewpoint. Normalized and consolidated 2D color image data sets for other spectra and for each viewpoint may also be captured, if desired.

As part of the characterization method, a calibration process of the quality check modules 130, 430, 430, 430A may commence where reference images without a specimen container 102 in the carrier 122 may be taken. In this way, computational burden may be minimized by removal of the tube background (the region outside of the specimen container 102) from each 2D image data set. Reference images for each exposure time and lighting condition (R, G, B, white light, UV, NIR, and/or IR) may be taken by the quality check module 130, 430, 430, 430A before (or after) carrying out the characterization/quantification.

For each 2D image data set including optimally-exposed pixels, a segmentation process may then be undertaken to generate one 2D consolidated image and identify a class for each pixel therein for each viewpoint. For example, the pixels may be classified as serum or plasma portion 212SP, settled blood portion 212SB, gel separator 313 (if present), air 212A, tube 212T, or label 218. Cap 214 may also be classified. Classification may be based upon a multi-class classifier (e.g., multi-class classifier 515 (FIG. 5A)) generated from multiple training sets. The multi-class classifier 515 may comprise a support vector machine (SVM) or a random decision tree, for example.

To carry out the pixel-level classification, first statistical data may be computed for each of the optimally-exposed pixels at the different spectra (e.g., R, G, B, etc.) for each viewpoint to generate 2D statistical data sets. The 2D statistical data sets may include mean values and covariance. Other statistics may be generated. The statistical data may include attributes up to second order which include mean values, variation and correlation values. In particular, the covariance matrix is computed over multi-dimensional data representing discriminative patterns.

Once generated, each 2D statistical data set is presented to, and operated on, by the multi-class classifier 515, which may classify the pixels in the image data sets as belonging to one of a plurality of class labels, such as 1—serum or plasma portion, 2—settled blood portion, 3—gel separator (if used), 4—air, 5—tube, 6—label, and possibly even 7—cap. From this, the pixels making up the liquid region (i.e., the serum and plasma portion 212SP) as well as the other regions may be identified. The result of the segmentation is consolidated 2D data sets, one data set for each viewpoint where all the pixels therein are classified.

The multi-class classifier 515 may be any suitable type of supervised classification model that is linear or non-linear. For example, the multi-class classifier 515 may be a support vector machine (SVM) that is either linear or kernel-based. Optionally, the multi-class classifier 515 may be a boosting classifier such as an adaptive boosting classifier (e.g., Ada-Boost, LogitBoost, or the like), any artificial neural network, a tree-based classifier (e.g., decision tree, random decision forests), and logistic regression as a classifier, or the like. A SVM may be particularly effective for classification between liquids and non-liquids, such as found in the analysis of the specimen 212 and specimen container 102. A SVM is a supervised learning model with associated learning algorithms that analyzes data and recognizes patterns. SVMs are used for classification and regression analysis.

Multiple sets of training examples are used to train the multi-class classifier 515, and then the image data sets are operated on by the multi-class classifier 515 and each pixel is classified as a result. The multi-class classifier 515 may be trained by graphically outlining various regions in a multitude of examples of specimen containers 102 having various specimen conditions, occlusion by label 218, levels of serum or plasma portion 212SP and settled blood portion 212SB, containing gel separator 313 or not, and the like. As many as 500 or more images may be used for training the multi-class classifier 515. Each training image may be outlined manually to identify and teach the multi-class classifier 515 the areas that belong to each class.

An SVM training algorithm may be used to build the multi-class classifier 515 that assigns pixels of any new specimen into one of the classes. The SVM model represents examples as points in space that are mapped so that the examples of the separate classes are divided by a clear gap that is as wide as possible. New pixels from the image data sets may be mapped into that same space and predicted to belong to a particular class based on where they fall on the map. In some embodiments, SVMs can efficiently perform a non-linear classification using what is called a kernel trick (e.g., kernel-based SVM classifier), implicitly mapping their inputs into high-dimensional feature spaces. SVM, tree-based classifiers, and boosting are particularly preferred. Other types of multi-class classifiers may be used.

The results of the multi-class classifier 515 that are deemed to be of the class serum or plasma portion 212SP and/or settled blood portion 212SB may then be used to further quantify the specimen 212.

Figure 5A:
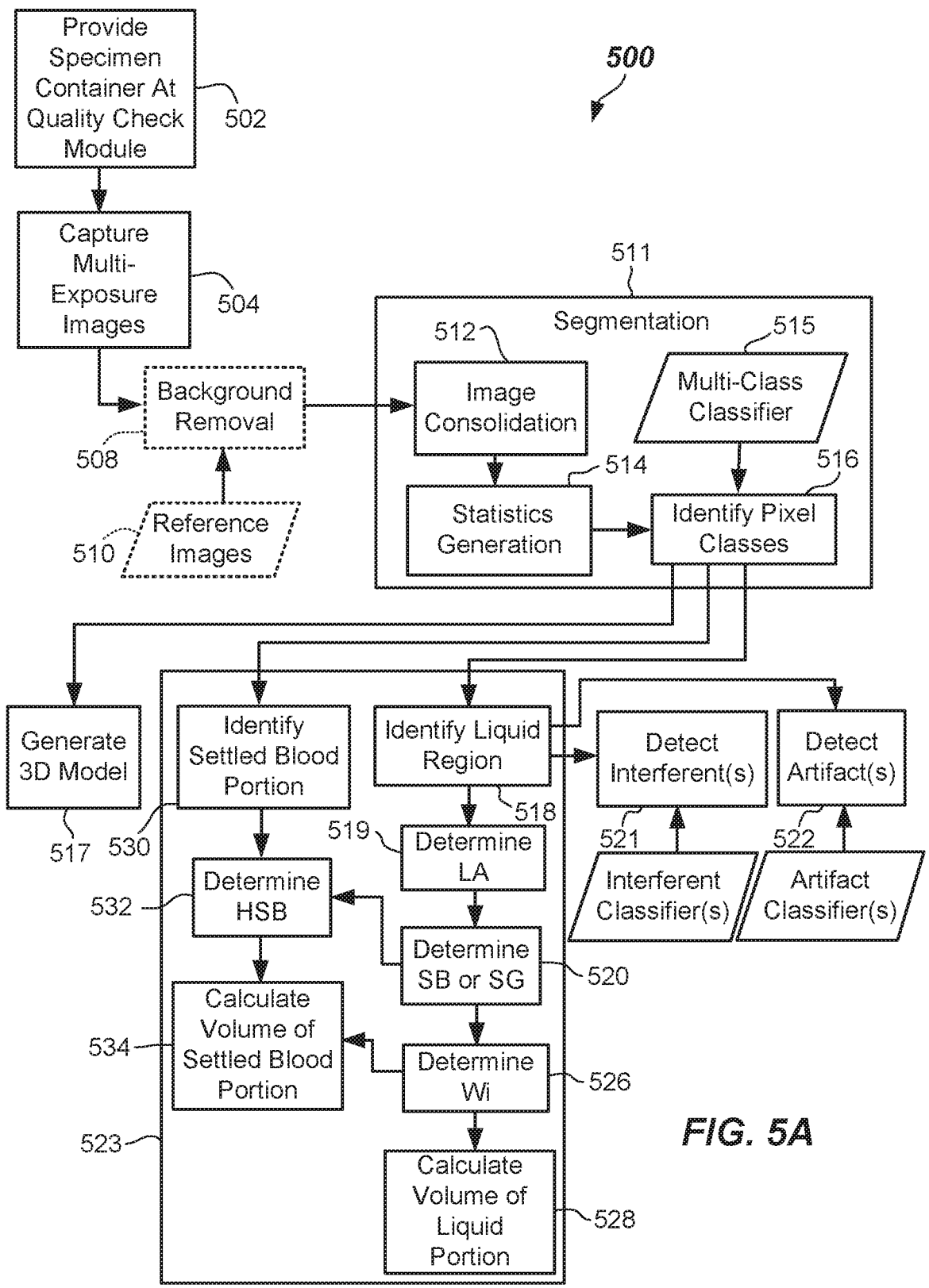
FIG. 5A illustrates a block diagram of components of a quality check module configured to characterize a specimen according to one or more embodiments.
Figure 5B:
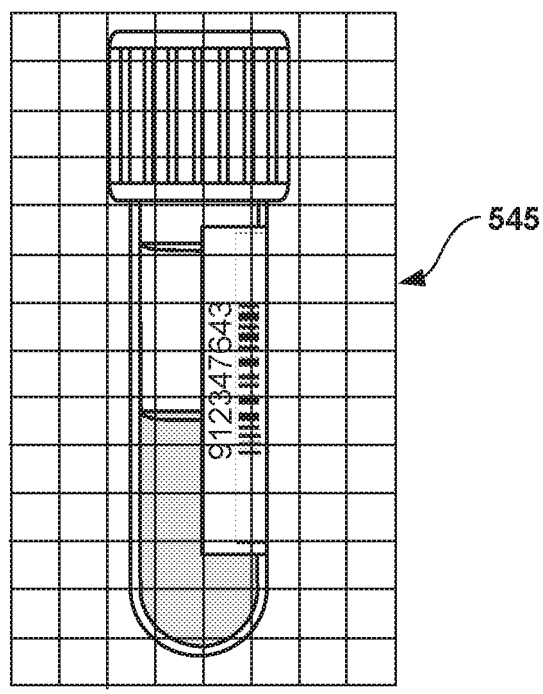
FIG. 5B illustrates a diagram of a specimen container image projected onto a virtual 3D voxel grid according to one or more embodiments.

A flow chart of the characterization method 500 according to one or more embodiments is shown in FIG. 5A. First, the specimen container 102 including specimen 212, e.g., carried by carrier 122, is provided at the quality check module (e.g., quality check module 130, 430, 430A, 430B) in 502. Multiple images are captured at 504; the multiple images being multi-spectral images taken at multiple different exposures and at multiple different spectra, and at one or more viewpoints, as described above. For quantification, the front lighted setup of quality check module 430B may be used. For detecting interferent in 521 or detecting artifact in 522, the backlit setup in FIGS. 4E and 4F or 4G may be used. In each case, the multiple images taken may be stored in memory of the computer 143. From these images, the background may optionally be removed in a background reduction phase of 508 to lower computational burden. Background removal may be accomplished by subtracting reference images previously taken in 510. A normalization of the data as between the various viewpoints may be undertaken in some embodiments.

After image capture in 504, and optional background removal in 508, segmentation may be undertaken in 511. The segmentation in 511 may include an image consolidation in 512. During image consolidation in 512, the various exposure time images at each color (R, G, B, etc.) and for each viewpoint are reviewed pixel-by-pixel to determine those pixels that have been optimally exposed, as compared to a standard (described above). For each corresponding pixel location of the exposure time images for each viewpoint, the best of any optimally-exposed pixel is selected for each color spectrum and viewpoint and included in an optimally-exposed 2D image data set. Thus, following image consolidation in 512, there is produced one optimally-exposed 2D image data set for each color spectrum (R, G, B, etc.) and for each viewpoint (e.g., for each camera 440, or cameras 440A-440C). The use of HDR processing may function to enrich the details of the images, especially with respect to reflection and absorption and this make characterization and quantification more accurate.

Following image consolidation in 512 or possibly concurrent therewith, statistics generation may be undertaken in 514, where statistical attributes up to second order are generated for each pixel, such as mean and covariance. This statistical data and the optimally-exposed 2D data sets are then operated on by the multi-class classifier 515 to identify the pixel classes present in the images data sets in 516. For each superpixel location, a statistical description may be extracted within a small patch (e.g. a superpixel of 11×11 pixels). Each patch provides a descriptor which is considered in the evaluation process. Typically the classifiers operate on feature descriptors and use output class labels during testing/evaluation. The final class for each superpixel may be determined my maximizing confidence values for each superpixel. The calculated statistical values encode specific properties of classes and are thus used for discrimination between different classes. From this segmentation of 511, a consolidated 2D image data set is generated for each of the viewpoints, wherein each pixel in the consolidated image data set is given a classification as one of a plurality of class types in 516 described above. From this segmentation in 511, a 3D model may be generated and constructed in 517 from the consolidated 2D image data sets. The 3D model may be used to ensure a result that is consistent among the various viewpoints if multiple cameras 440A-440C are used.

According to the method, the liquid region (e.g., the serum or plasma portion 212SP) may be identified in 518. This may involve grouping all the pixels from class—serum or plasma portion 212SP, and then determining a location of the upper interface between liquid (serum or plasma portion 212SP) and air 212A (i.e., LA) in 519 for the consolidated 2D image data sets. This may be done for each viewpoint. A numerical value for LA may be calculated for each of the consolidated 2D image data sets by averaging the locations of the uppermost pixels classified as serum or plasma portion 212SP for each viewpoint. Any substantial outliers may be rejected and not used in the average. Previously performed pixel space to machine space (e.g., in mm) calibration may be accomplished by any known machine space to image space calibration technique and may be used to convert pixel space to machine space useable by the robot 124 for gripping or by other robots used for aspiration. These numerical values for LA for each viewpoint (if more than one viewpoint) can be aggregated to identify a final value of LA that may be used in the 3D model. The aggregation may be by any suitable method to fuse the respective results of the viewpoints, such as by averaging the numerical values for LA for each of the viewpoints, for example. If one value is substantially below the other two, it may be discarded as an outlier.

Depending on whether a gel separator 313 is present (e.g., used), the quantification method then may determine the location of SB or SG (if gel separator is present) in 520 for each viewpoint. A numerical value for SB or SG for each viewpoint may be calculated in 520 by averaging or aggregating the locations of the lowermost pixels classified as serum or plasma portion 212SP in 516. A single value for SB or SG may be determined for the 3D model by averaging the SB or SG values for the various viewpoints. From the locations of LA and SB or SG, the height of the serum or plasma portion HSP (FIGS. 2 and 3) may be determined via subtraction of the averages for LA and SB or SG.

Quantifying the liquid region (e.g., the serum or plasma portion 212SP) may further include determining an inner width (Wi) of the specimen container 102 in 526. In some embodiments, the outer width (W) may first be determined in 526 by identifying the pixels that are classified as tube 212T for each consolidated 2D image data set and subtracting the locations of corresponding ones of the pixels that are located on the lateral outside edges of the tube 212T (for example, as measured between LA and SB or SG), and then averaging the subtracted values for each viewpoint. A final value of outer width W may be determined by averaging the W values from the viewpoints. Substantial outliers may be ignored. Wi may be determined from W by subtracting twice the wall thickness Tw. Tw may be an average wall thickness value that has been estimated for all specimen containers 102 and stored in memory or Wi may be obtained from a lookup table based upon the tube type determined based upon the determined outer width W and the determined height HT value for the specimen container 102.

From HSP, and Wi, the volume of the liquid region (e.g., the serum or plasma portion 212SP) may be calculated using Eqn. 1 below in 528 for the 3D model.

$$VSP = HSP \times Pi/4 Wi^2 \qquad \text{Eqn. 1}$$

To quantify the settled blood portion 212SB, a similar method may be followed. The pixels corresponding to the class of settled blood portion 212SB may first be identified in 530. Depending on whether a gel separator 313 is present, height of the settled blood portion HSB for each viewpoint may be determined in 532 by locating the lowermost pixel of the settled blood portion 212SB in each consolidated 2D image data set and then subtracting either SB or BG. SB may be determined in 520. In the gel separator 313 is present, then BG may be determined for each viewpoint by averaging the lowermost vertical locations of pixels classified as gel separator 313. The lowermost pixel of the settled blood portion 212SB may be determined by finding the lowestmost vertical dimension of the specimen container 102 and then subtracting the wall thickness Tw for each viewpoint. Wi may be determined in 526. A final value of HSB may be determined by averaging the respective HSB values of each of the viewpoints. From the final value of HSB and Wi, the volume of the settled blood portion 212SB may be determined in 534 using Eqn. 2 below for the 3D model.

$$VSB = (HSB \times Pi/4 Wi^2) - \tfrac{1}{2} Wi^2 + (Pi/24) Wi^3 \qquad \text{Eqn. 2}$$

Optionally, the various pixel classes of the consolidated 2D images for each of the viewpoints can be aggregated and mapped to reconstruct a 3D virtual voxel grid 345 (FIG. 5B) surrounding the specimen container 102. Each pixel has a defined location in a 2D virtual grid, which than can be projected onto the 3D virtual voxel grid 345 from the three directions to generate the 3D model in 517. Grids from the 2D perspective are aligned with the 3D virtual voxel grid 345 based upon calibration information between the camera 440A-440C and pose for each viewpoint. Some redundancy (overlap) between the edge structures of each 2D grids may be present. The classes, having been assigned for each consolidated 2D image data set, may be grouped together for each viewpoint to form regions of: serum or plasma portion 212SP, settled blood portion 212SB, gel separator 313 (if present), air 212A, tube 212T, label 218, and possibly even cap 214, for each viewpoint. Voxels of each respective region are traversed onto the 3D virtual voxel grid 345, and if the classes are consistent between the adjacent viewpoints then the pixels in the overlapping region are assigned the common class.

As a result, the various regions are mapped to the 3D model and each region can be quantified using the calibration information and measurements from the 3D virtual voxel grid 345. The region locations of the 3D model may be used to determine where to place the aspiration probe tip so that no air 212A or settled blood portion 212SB or gel separator 313 are aspirated.

Once the liquid region is identified in 518, a presence of an interferent (e.g., H, I, and/or L) therein may be determined by operating on the 2D data sets of the liquid region with one or more interferent classifiers. In one embodiment, a separate classifier may be used for each of H, I, and L as described in U.S. Provisional Patent Application No. 62/288,375 entitled "Methods and Apparatus for Detecting an Interferent in a Specimen," filed Jan. 28, 2016. It should also be recognized that averaged values may also be used to provide HIL index values (Havg, Iavg, Lavg) in 521 that may be used to provide interferent levels for the specimen 212 as an average of the multiple viewpoints. In this way, one consistent classification may be obtained for H, I, L, or N for the 3D model.

At the quality check module 130, 430, 430A, 430B, a presence of an artifact (e.g., clot, bubble, and/or foam) may be determined by operating on the 2D data sets of the liquid region in 522 with one or more artifact classifiers. If multiple viewpoints, each viewpoint may be used to generate an area for that particular view. The areas of the artifacts from the various viewpoints may then be used to determine an estimated volume of the artifact. 2D images may be used to triangulate structures in 3D where volume may be derived from geometric computation. An estimated volume of the artifacts may be subtracted from the volume VSP, so that a better estimate of the available liquid is provided. The various viewpoints can be used to project the location of the artifact onto the virtual 3D voxel grid and the dimensions from each 2D projection can be used to even better estimate the volume and 3D location of the artifact. Further discussion of the artifact detection may be found in U.S. Provisional Patent Application No. 62/288,358 entitled "Methods and Apparatus For Classifying An Artifact In A Specimen," filed Jan. 28, 2016.

Accordingly, it should be apparent that the model-based characterization method 500 carried out by the quality check module 130, 430, 430A, 430B herein may result in a rapid quantification of the serum or plasma portion 212SP and/or the settled blood portion 212SB of the specimen 212. Final results and determinations can be aggregated across the multiple viewpoints and displayed as a 3D model.

Figure 6:
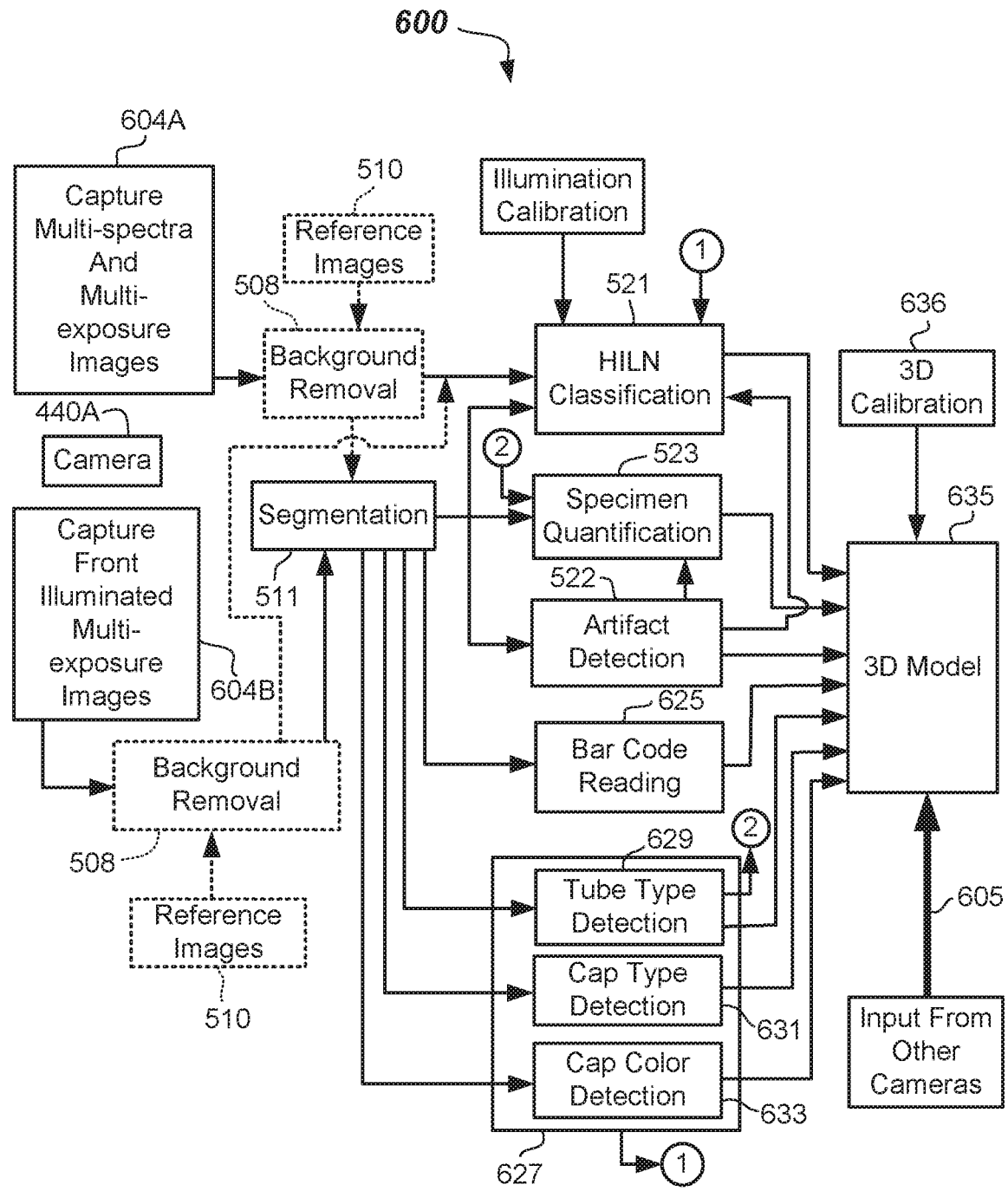
FIG. 6 illustrates a general block diagram of components of a quality check module including capability to characterize a specimen and specimen container according to one or more embodiments.

FIG. 6 illustrates a flowchart of a characterization method 600 wherein many items may be characterized using the quality check module 130, 430, 430A, 430B. According to one or more embodiments of the method 600, images are captured, such as by multiple cameras (camera 440A is shown). Cameras 440B, 440C may be used to capture images from other viewpoints. The processing that will be described for the images captured on camera 440A is identical for the other cameras 440B, 440C at the other viewpoints and their inputs in line 605 may be used to develop a 3D model 635 of the specimen 212 used for final determinations or for resolving any differences between the various viewpoints.

The images captured by camera 440A and the other cameras 440B, 440C may be multi-spectral (e.g., R, G, B or other spectrum) and multi-exposure images, as discussed above. In particular, multiple exposures (e.g., 4-8 exposures or more) may be taken for each spectra of light used in 604A at each viewpoint. The respective images at each exposure for each camera 440A-4400 may be obtained simultaneously or sequentially using monochrome cameras and backlighting by light panel assemblies 450A-450C as described in FIGS. 4E-4F. Optionally, front illuminated multi-exposure images using a white light sources of light panel assemblies 450E, 450F of FIG. 4G may be obtained in 604B using a color camera.

Optionally, more than one quality check module may be used. For example, quality check module 430B may be used for quantification and quality check module 430A may be used for HILN detection. However, either one of the quality check modules 430A, 430B may be used for quantification and HILN detection.

The images may then be optionally processed in 508 to remove background using reference images 510, as described above in optional background removal method. The images may then be further processed to determine segmentation in 511 in the manner described above. In some embodiments, the images from front lit cameras in 604B may be best used for segmentation in 511. Likewise, any images captured in 604A may be best used for characterization of HILN in 521. However, clearly, images captured in 604A could be used for segmentation in 511, and images captured in 604B could be used for HILN detection in 521.

Identifying and quantification of the liquid in 523 in accordance with the methods described herein may also be carried out following segmentation in 511. Quantifying the liquid in 523 may involve the determination of certain physical dimensional characteristics of the specimen 212 such as a physical locations of LA, SB, SG, and/or BG, and/or determination of HSP (depth of the serum or plasma portion 212SP), HSB (depth of the settled blood portion 212SB), and/or HTOT, and/or a volume of the serum or plasma portion (VSP) in 528 and/or a volume of the settled blood portion (VSB) in 534 as discussed above. The inner width (Wi) may be obtained from the specimen container characterization in 526.

To provide an even closer measurement of the actual volume of serum or plasma portion 212SP that is available for testing, or simply to flag the presence of an artifact, an artifact detection method may be employed in 522 to identify a presence of clot, bubble, or foam in the serum or plasma portion 212SP. The respective estimated volume of the one or more artifacts present may be subtracted from the estimated volume of the serum or plasma portion VSP determined in 528 to obtain a better volume estimate. The 2D image data for each viewpoint may be processed in 522 using artifact classifiers to determine the presence or absence of an artifact in the serum or plasma portion 212SP. The pixels identified as being an artifact by artifact detection 522 may then be ignored in the quantification method described herein, but may also be ignored in the HILN classification in 521, so as not to skew the results. Detection of an artifact may also initiate remediation in some embodiments.

The results of the segmentation in 511 can also be used to identify the label 218, which may include the identifying information 215, such as a barcode. The barcode may be read in 625. Conventional barcode reading software may be used once the label 218 is identified in the segmentation in 511. If a particular image does not contain enough of the barcode to be read, the barcode can be read from, or in conjunction with, the data from other images obtained from other viewpoints.

Further characterization of the specimen container 102 may also be accomplished according to the broader method 600 in 627. The characterization of the tube type in 629, cap type in 631, and cap color in 633 from the various viewpoints may be supplied and enable the generation of the 3D model in 635. The data from the various views may be compared so as to verify that the same characterization was achieved based on processing the images from each viewpoint (e.g., from cameras 440A-440C). If slightly different values are obtained, then the values may be averaged. All of the outputs from the HILN classification in 521, specimen quantification in 523, artifact detection in 522, and specimen container detection in 627 may be used to generate the 3D model 635. The 3D model 635 may be used for final decision making, characterization, and/or harmonization of the results from the various viewpoints (e.g., cameras 440A-440C). 3D calibration in 636 may include coordinating the positions of the various viewpoints to the 3D space. A 3D virtual voxel grid may be used for coordination of the 2D to 3D views.

Figure 7:
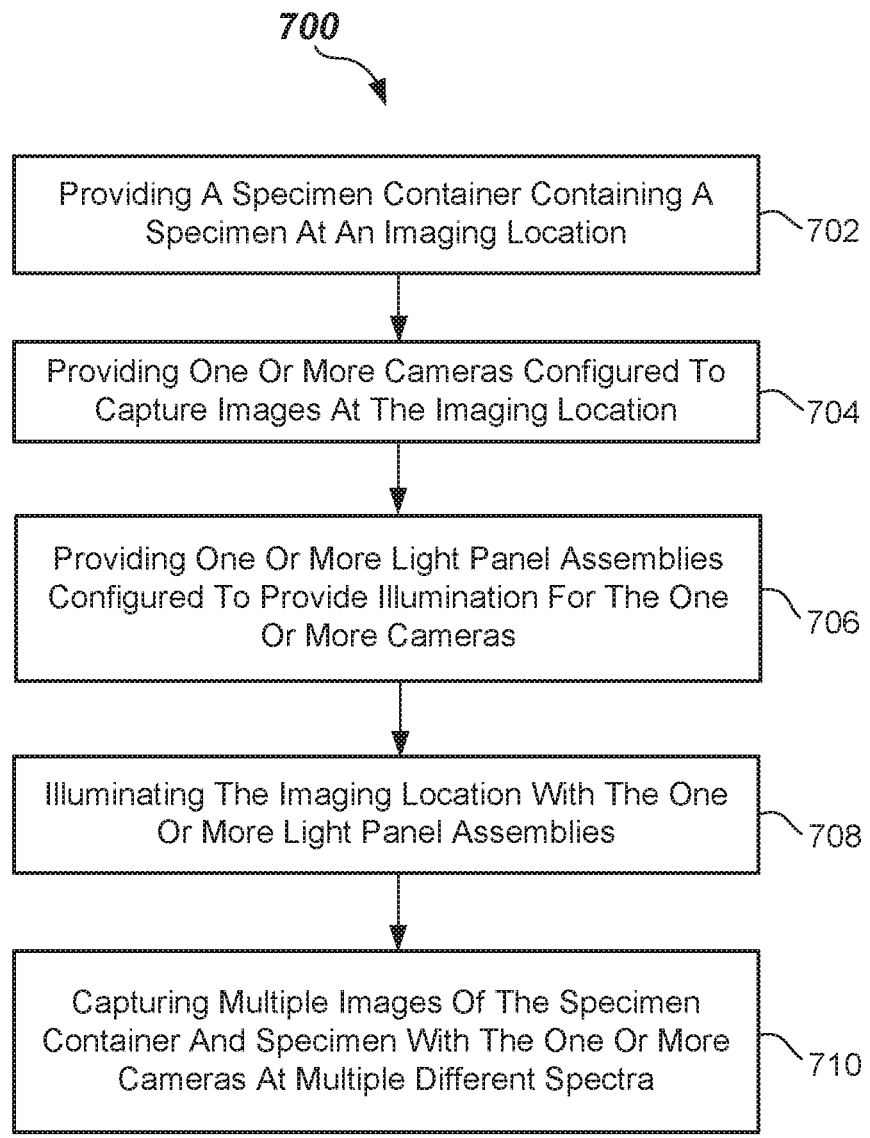
FIG. 7 is flowchart of a method of imaging a specimen container and specimen according to one or more embodiments.

FIG. 7 illustrates a flowchart of a method of imaging a specimen container and/or contents according to one or more embodiments. The method 700 includes, in 702, providing a specimen container (e.g., specimen container 102, such as a capped blood collection tube) containing a specimen (e.g., specimen 212) at an imaging location (e.g., imaging location 441). Imaging location 441 may be inside of a quality check module 130, 430, 430A, 430B. The specimen container (e.g., specimen container 102) may be placed at the imaging location (e.g., imaging location 441) by being transported thereto on a track (e.g., track 121) or being placed there by a robot (e.g., robot 124 or the like).

The method 700 includes, in 704, providing one or more cameras (e.g., cameras 440, 440A-440C) that are configured to capture images at the imaging location (e.g., imaging location 441), and, in 706, providing one or more light panel assemblies (e.g., light panel assemblies 450, 450A, 450B) configured to provide illumination for the one or more cameras (e.g., cameras 440, 440A-440C). The illumination may be multiple spectra (e.g., R, G, B, UV, NIR, and/or IR) in one embodiment and even white light (e.g., 400 nm-700 nm) in another embodiment. Other spectral lighting elements may be used.

The method 700 includes, in 708, Illuminating the imaging location (e.g., imaging location 441) with the one or more light panel assemblies (e.g., light panel assemblies 450, 450A, 450B), and, in 710, capturing multiple images of the specimen container (e.g., specimen container 102) and specimen (e.g., specimen 212) with the one or more cameras at multiple different spectra having different nominal wavelengths that may not overlap or may even overlap slightly. The term wavelength as used in this context means that each image is captured at a specific nominal wavelength, but some small range of wavelength around the nominal may be included (e.g., ±35 nm).

The capturing multiple images in 710 may be at different exposures (e.g., exposure times) as well as illumination by the different spectra. For example, there may be 4-8 different exposures taken at different exposure times in some embodiments, but each image taken under the same lighting intensity. In one or more embodiments, some images may be captured using white light and using back lighting and light filtering using a filter assembly (e.g., filter assembly 463). In other embodiments, images may be captured using a plurality of narrow-band light sources including a nominal wavelength, such as red, green, and blue. These may be provided by light panel assemblies 450-450F providing backlit light sources in some embodiments. In other embodiments, white light elements may be used in lighting panel assembly 450W. The white light images may be resolved into R, G, and B images as captured by the computer 143, as discussed above. In each instance, the images may be taken by multiple cameras 440A-440O from multiple viewpoints.

The method may optionally include background removal to subtract some of the background in order to lower computational burden. Background removal may be accomplished by subtracting the images from corresponding reference images, which may be taken as part of a calibration process. Reference images may be taken at the same exposure times, spectra and lighting conditions as for the images of the specimen container 102, but may be captured without a specimen container 102 or carrier 122. Background removal may also include normalization between various viewpoints in some embodiments.

The method 700 may include providing classified 2D data sets obtained by processing the plurality of 2D images of the specimen container containing a specimen taken from the multiple viewpoints. The classified 2D data sets being classified as one or more of serum or plasma, settled blood portion, gel separator (if present), air, tube, label, and even cap.

The method 700 may include correlating locations in the classified 2D data sets to a consolidated 3D data set. In this manner, a 3D model may be formed (e.g., constructed) based upon the classified 2D data set that have been obtained from the various viewpoints. Correspondence between the segmentation of the various viewpoints may be confirmed with the 3D model. In some embodiments, the consolidated 3D model generated from the multiple 2D data sets may be used to provide a final result in regards to characterization of a presence or absence (normal—N) of an interferent (H, I, and/or L). If an interferent is detected, an interferent level may be assessed and reported based upon the consolidated data. Likewise, the consolidated 3D model generated from the multiple 2D data sets may be used to provide a final result in regards to characterization of a presence or absence of an artifact (clot, bubble, foam). The results of the 2D data sets or 3D model may be displayed or reported in any suitable manner or format, such as by displaying a 3D colored image on a display screen, providing a colored printout, displaying or providing a data sheet of measured values, or the like.

While the quality check module 130 has been shown in FIG. 1 as being located such that the characterization is performed immediately after centrifugation on the centrifuge 125, it may be advantageous to include this feature directly on an analyzer (e.g., analyzer 106, 108, and/or 110) in some embodiments, or elsewhere in the specimen testing apparatus 100. For example, stand-alone analyzers at remote station 132 that are not physically connected to the track 121 of the specimen testing apparatus 100 could use this technique and quality check module 130 to characterize specimens 212 prior to analysis. Furthermore, in some embodiments, the centrifugation may be performed prior to loading the racks 104 into the loading area 105, so that in some embodiments, the quality check module 130 may be located at the loading area 105 and the quality check can be carried out as soon as the robot 124 loads a specimen container 102 into a carrier 122. The quality check modules 130, 430, 430A, 430B are generally interchangeable and may be used at any desired location about the track or even as a stand-alone station that is visited by each specimen container 102 prior to being placed into the loading area.

While the invention is susceptible to various modifications and alternative forms, specific system and apparatus embodiments and methods thereof have been shown by way of example in the drawings and are described in detail herein. It should be understood, however, that it is not intended to limit the invention to the particular apparatus or methods disclosed but, to the contrary, the intention is to cover all modifications, equivalents, and alternatives falling within the scope of the invention.

What is claimed is:

1. A quality check module, comprising:
   an imaging location within the quality check module configured to receive a specimen container containing a specimen;
   a camera located adjacent to the imaging location, the camera having a viewpoint extending therefrom to the imaging location; and
   a spectrally-switchable light source included in a light panel assembly located adjacent to and on an opposite side of the imaging location as the camera and in line with the viewpoint, the light panel assembly configured to provide lighting for the camera, the spectrally-switchable light source configured to be operatively switchable between multiple different spectra,
   wherein the camera is configured to generate first images of the imaging location at different exposure times while illuminated by a first spectra provided by the spectrally-switchable light source and generate second images of the imaging location at different exposure times while illuminated by a second spectra provided by the spectrally-switchable light source.

2. The quality check module of claim 1, wherein the light panel assembly comprises:
   a mounting frame,
   a light guide; and
   a light array configured to emit light into the light guide and provide illumination of a front surface of the light panel assembly.

3. The quality check module of claim 1, wherein the spectrally-switchable light source comprises light emitting lighting elements and a filter assembly including two or more individually-selectable band-pass filters.

4. The quality check module of claim 3, wherein the individually-selectable band-pass filters comprise red, green, and blue band-pass filters.

5. The quality check module of claim 3, wherein the individually-selectable band-pass filters comprise a near infrared band-pass filter or ultraviolet band-pass filter.

6. The quality check module of claim 1, wherein the camera is spectrally selective and configured to output two or more selected different spectra.

7. The quality check module of claim 1, comprising a plurality of cameras arranged at a plurality of viewpoints around the imaging location and a plurality of spectrally-switchable light sources positioned to illuminate the imaging location.

8. The quality check module of claim 7, wherein the light panel assembly provides back lighting, front lighting, or combinations of back lighting and front lighting.

9. A quality check module, comprising:
   an imaging location within the quality check module configured to receive a specimen container containing a specimen;
   a plurality of cameras arranged at multiple viewpoints around the imaging location; and
   a plurality of light panel assemblies each including a spectrally-switchable light source, each light panel assembly located adjacent to the imaging location on an opposite side of the imaging location as a respective one of the plurality of cameras and in line with the viewpoint of the respective one of the one or more cameras, and each light panel assembly configured to provide lighting for the plurality of cameras, each of the spectrally-switchable light sources configured to be switchable between multiple different spectra, wherein each of the cameras is configured to generate first images of the imaging location at different exposure times while illuminated by a first spectra provided by one or more of the spectrally-switchable light sources and generate second images of the imaging location at different exposure times while illuminated by a second spectra provided by one or more of the spectrally-switchable light sources.

10. The quality check module of claim 9, wherein each light panel assembly comprises:
a mounting frame;
a light guide; and
a light array configured to emit light into the light guide and provide illumination of a panel front surface of the light panel assembly.

11. The quality check module of claim 9, wherein one or more of the spectrally-switchable light sources comprise lighting elements and a filter assembly including individually-selectable band-pass filters.

12. The quality check module of claim 9, comprising a carrier holding the specimen container at the imaging location.

13. The quality check module of claim 9, wherein the plurality of cameras is configured to capture multiple lateral images of the specimen or specimen container at multiple different exposure times and multiple different spectra while being illuminated by the light panel assemblies.

14. The quality check module of claim 9, wherein each light panel assembly includes:
a first light array including light elements that are adapted to emit at least two different spectra arranged along a first edge of a light guide, and
a second light array including light elements that are adapted to emit at least two different spectra arranged along a second edge of the light guide.

15. The quality check module of claim 9, comprising:
a computer coupled to the plurality of cameras and adapted to process image data obtained from the plurality of cameras, the computer configured and operable to:
select optimally-exposed pixels from the images at different exposure times and generate optimally-exposed image data for each spectra,
compute statistics of the optimally-exposed pixels at each of the spectra to generate statistical data, and
identify at least a serum or plasma portion of the specimen.

16. The quality check module of claim 15, wherein the computer is operable to characterize physical dimensional features of the specimen container.

17. The quality check module of claim 9, wherein the plurality of cameras arranged at the multiple viewpoints are spectrally selective and configured to output two or more selected different spectra.

18. A method of characterizing a specimen container and/or a specimen, comprising:
providing a specimen container containing a specimen at an imaging location;
providing one or more cameras configured to capture images at the imaging location, each having a viewpoint extending to the imaging location;
providing one or more light panel assemblies each on an opposite side of the imaging location as a respective one of the one or more cameras and in line with the viewpoint of the respective one of the one or more cameras, the one or more light panel assemblies configured to provide illumination for the one or more cameras, at least one of the one or more light panel assemblies comprising a spectrally-switchable light source;
illuminating the imaging location with the one or more light panel assemblies; and
capturing first images of the imaging location at different exposure times while illuminated by a first spectra provided by the spectrally-switchable light source and capturing second images of the imaging location at different exposure times while illuminated by a second spectra provided by the spectrally-switchable light source.

19. The method of claim 18, comprising processing the multiple images to characterize the specimen container or the specimen.

20. A specimen testing apparatus, comprising:
a track;
a carrier on the track that is configured to contain a specimen container; and
a quality check module on the track, the quality check module including:
an imaging location within the quality check module configured to receive a specimen container containing a specimen,
one or more spectrally-switchable light sources each included in a light panel assembly located adjacent the imaging location and configured to provide lighting at the imaging location, the one or more spectrally-switchable light sources configured to be switchable between multiple different spectra; and
a camera located adjacent to the imaging location and having a viewpoint extending to the imaging location, the camera located on an opposite side of the imaging location as the light panel assembly which is in line with the viewpoint, the camera configured to generate first images of the imaging location at different exposure times while illuminated by a first spectra provided by the one or more spectrally-switchable light sources and generate second images of the imaging location at different exposure times while illuminated by a second spectra provided by the one or more spectrally-switchable light sources.

* * * * *